US007812977B2

(12) United States Patent
Narusawa

(10) Patent No.: US 7,812,977 B2
(45) Date of Patent: Oct. 12, 2010

(54) IMAGE-PROCESSING SYSTEM, IMAGE-PROCESSING METHOD, AND PRODUCT OF IMAGE-PROCESSING PROGRAM FOR DISPLAYING AN IMAGE INDIVIDUALLY OR AS A COMPOSITE IMAGE

(75) Inventor: Hideyuki Narusawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1173 days.

(21) Appl. No.: 11/192,440

(22) Filed: Jul. 29, 2005

(65) Prior Publication Data
US 2006/0066886 A1 Mar. 30, 2006

(30) Foreign Application Priority Data
Jul. 29, 2004 (JP) ............... P2004-221939
Aug. 4, 2004 (JP) ............... P2004-227711

(51) Int. Cl.
G06K 15/00 (2006.01)
(52) U.S. Cl. ............ 358/1.13; 358/1.18; 358/450; 358/452; 358/540; 382/284; 382/306
(58) Field of Classification Search ......... 358/1.1–1.18, 358/540, 450, 452; 382/284, 306
See application file for complete search history.

(56) References Cited
U.S. PATENT DOCUMENTS

| | | | | |
|---|---|---|---|---|
| 5,359,387 A | * | 10/1994 | Hicks | 355/40 |
| 5,600,412 A | * | 2/1997 | Connors | 399/81 |
| 6,031,632 A | * | 2/2000 | Yoshihara et al. | 358/403 |
| 6,128,411 A | * | 10/2000 | Knox | 382/232 |
| 6,141,111 A | * | 10/2000 | Kato | 358/1.15 |
| 6,222,637 B1 | * | 4/2001 | Ito et al. | 358/1.18 |
| 2004/0151399 A1 | * | 8/2004 | Skurdal et al. | 382/266 |
| 2004/0190059 A1 | * | 9/2004 | Winter et al. | 358/1.15 |
| 2005/0018926 A1 | | 1/2005 | Momose et al. | |
| 2005/0152002 A1 | | 7/2005 | Shirakawa et al. | |
| 2006/0119911 A1 | * | 6/2006 | Narusawa | 358/527 |
| 2006/0155732 A1 | * | 7/2006 | Momose et al. | 707/101 |

FOREIGN PATENT DOCUMENTS

| | | |
|---|---|---|
| EP | 1 498 811 A1 | 1/2005 |
| JP | 2004-015286 A | 1/2004 |
| WO | WO 03/085510 A1 | 10/2003 |

* cited by examiner

Primary Examiner—Twyler L Haskins
Assistant Examiner—Dennis Dicker
(74) Attorney, Agent, or Firm—Sughrue Mion, PLLC

(57) ABSTRACT

A job-receiving section receives a job with regard to a first-type image. A job-setting-receiving section receives a command for selecting, with regard to the job of the first-type image to which a second-type image is related, either a merging setting or a non-merging setting. A job-processing section processes the received job. The merging setting is a setting for merging the first-type image and the second-type image, and the non-merging setting is a setting for not merging the first-type image and the second-type image. The job-processing section displays on an output section, with regard to the job of the first-type image to which the second-type image is related, either the first-type image, or a composite image of the large first-type image and the second-type image, in accordance with the command received by the job-setting-receiving section.

9 Claims, 25 Drawing Sheets

*FIG. 7*

| |
|---|
| UUID : "ABCDEFG" |
| PAPER SIZE : POSTCARD<br>ORIENTATION OF PRINTING PAPER<br>: PORTRAIT LAYOUT |
| RENDERING OF PHOTOGRAPHIC IMAGE<br>: (X1, Y1), (X2, Y2)<br>RENDERING OF FRAME IMAGE : (X3, Y3), (X4, Y4)<br>FRAME IMAGE FILE : "Birthday" |

FIG. 13A

| 61a | G  61b | 61c |
|---|---|---|
| 0001 . exif | 937456383 | |
| 0002 . exif | 394827261 | |
| 0003 . exif | 194367294 | |
| 0004 . exif | 394827261 | |
| 0005 . exif | 937456383 | |

FIG. 13B

| 71a | 71b | T  71c | 71d | |
|---|---|---|---|---|
| 0 | 462548928 | BIRTHDAY 1.usd | A4 | PORTRAIT LAYOUT |
| 1 | 194367294 | BIRTHDAY 2.usd | POSTCARD | PORTRAIT LAYOUT |
| 2 | 394827261 | NEW YEAR'S CARD 1.usd | A4 | LANDSCAPE LAYOUT |
| 3 | 573983046 | NEW YEAR'S CARD 2.usd | POSTCARD | LANDSCAPE LAYOUT |
| 4 | 937456383 | NEW YEAR'S CARD 3.usd | B5 | PORTRAIT LAYOUT |

FIG. 15

| | G | |
|---|---|---|
| 0001 . exif | 937456383 | 4 |
| 0002 . exif | 394827261 | 2 |
| 0003 . exif | 194367294 | 1 |
| 0004 . exif | 394827261 | 2 |
| 0005 . exif | 937456383 | 4 |

| | | T | | |
|---|---|---|---|---|
| 0 | 462548928 | BIRTHDAY 1.usd | A4 | PORTRAIT LAYOUT |
| 1 | 194367294 | BIRTHDAY 2.usd | POSTCARD | PORTRAIT LAYOUT |
| 2 | 394827261 | NEW YEAR'S CARD 1.usd | A4 | LANDSCAPE LAYOUT |
| 3 | 573983046 | NEW YEAR'S CARD 2.usd | POSTCARD | LANDSCAPE LAYOUT |
| 4 | 937456383 | NEW YEAR'S CARD 3.usd | B5 | PORTRAIT LAYOUT |

FIG. 16

| 0001 . exif | 637456383 | BIRTHDAY 1.usd | A4 | PORTRAIT LAYOUT |
|---|---|---|---|---|
| 0002 . exif | 394827261 | BIRTHDAY 2.usd | POSTCARD | PORTRAIT LAYOUT |
| 0003 . exif | 194367294 | NEW YEAR'S CARD 1.usd | A4 | LANDSCAPE LAYOUT |
| 0004 . exif | 394827261 | NEW YEAR'S CARD 2.usd | POSTCARD | LANDSCAPE LAYOUT |
| 0005 . exif | 937456383 | NEW YEAR'S CARD 3.usd | B5 | PORTRAIT LAYOUT |

FIG. 17

| 0001 . exif | FOUND |
| 0002 . exif | NONE |
| 0003 . exif | FOUND |
| 0004 . exif | FOUND |
| 0005 . exif | NONE |

FIG. 18

| 0001 . exif | 937456383 |
| 0002 . exif | 394827261 |
| 0003 . exif | 194367294 |
| 0004 . exif | 394827261 |
| 0005 . exif | 937456383 |

IMAGE-PROCESSING SYSTEM, IMAGE-PROCESSING METHOD, AND PRODUCT OF IMAGE-PROCESSING PROGRAM FOR DISPLAYING AN IMAGE INDIVIDUALLY OR AS A COMPOSITE IMAGE

BACKGROUND ART

The present invention relates to an image-processing system, an image-processing method and a product of image-processing program.

Conventionally, there has been known a digital camera which can store a photographic image while relating a decorative frame for decorating the image at the time of printing or displaying on a screen thereto. At the time of storing a photographic image while relating a decorative frame thereto, such a digital camera stores in a removable memory the photographic image, the image representing the decorative frame, and data for relating these images together. In a case where an image-processing system capable of interpreting a relation between a decorative frame and a photographic image performs collective, continuous printing of photographic images stored in a removable memory as described above, the image-processing system provides a print preview of a photographic image related to a decorative frame merged with the decorative frame; and provides a print preview of only a photographic image which is not related to a decorative frame. (See WO03/85510 brochure).

Meanwhile, the user can cause a printer or an image-processing system with a display to display only a photographic image without merging the photographic image and a decorative frame previously associated with the photographic image, by means of changing data pertaining to a relation between a decorative frame and a photographic image.

However, in a conventional image-processing system, a relation between a photographic image and a decorative image cannot be changed in a mode for setting output processing of photographic images. For instance, in a setting mode for performing continuous printing of all the photographic images stored in the removable memory in a so-called stand-alone-type printer to which a removable memory can be connected, the user can set the number of copies to be printed, a paper size, and the like, of the photographic images; however, the relation between a photographic image and a decorative frame cannot be changed. In addition, in, e.g., a setting mode for a slide show of a digital camera, or the like, a display time for a single image, and the like, can be set; however, the relation between a photographic image and a decorative frame cannot be changed. Accordingly, conventionally, in a case where printing, or the like, of a photographic image is to be performed after the relation between the photographic image and a decorative frame has been changed, setting operation must be performed in a setting mode for display processing, such as printing, and in another setting mode other than the setting mode, whereby operations are complicated.

In a case where a plurality of template files are present, when a relation between an image file and a template file has been established in advance, establishment of the relation every time printing is obviated, thereby providing convenience. For instance, when an identifier of a template file to be related thereto is to be stored in an image file, at a time of selection of an image file, the related template file can be specified uniquely by means of acquiring the identifier from the selected image file.

However, when an identifier of a template file is stored in an image file, in a case where, e.g., an attempt is made to display a list of file names of image files to which template files are related, all the image files must be opened so as to discriminate whether or not an identifier is included therein. In general, since file-opening processing is time-consuming, when the number of image files is large, a user must wait for a long time until the list is displayed.

SUMMARY OF THE INVENTION

An object of the present invention is to provide an image-processing system which can set an image-to which another image for forming a composite image is associated-to a job for displaying either as the composite image or singly, and which exhibits excellent operability, as well as to an image-processing method and to a product of image-processing program.

Another object of the invention is to provide an image-processing system which, in a case where a second-type file in which a second-type image is stored is related to a first-type file in which a first-type image is stored, by means of storing an identifier of the second-type file in which the second-type image is stored in the first-type file in which the first-type image is stored, even when a plurality of the first-type files are present, enables confirmation within a short period of time as to whether or not the second-type file in which the second-type image is stored is related to each of the first-type files in which the first-type image is stored, as well as an image-processing method and a product of image-processing program.

An image-processing system conceived to achieve the above objects has a job-receiving means for receiving a job in relation to a first-type image; a job-setting-receiving means for receiving a related setting command for selecting, in relation to the job of the first-type image to which a second-type image is related, either a merging setting for merging the first-type image and the second-type image, or a non-merging setting for not merging the first-type image and the second-type image; and a job-processing means which processes the received job, and which displays the first-type image with regard to the job of the first-type image to which the second-type image is not related, and, with regard to the job of the first-type image to which the second-type image is related, displays either the first-type image or the composite image of the first-type image and the second-type image on an output section in accordance with the merging setting or the non-merging setting having been selected in accordance with the related setting command.

The image-processing system as described above receives a related setting command for selecting, with regard to the job for displaying the first-type image on the output section, either the merging setting for merging the first-type image and the second-type image, or the non-merging setting for not merging the first-type image and the second-type image. Accordingly, a user can set whether an image—to which another image for forming a composite image is related—is to be displayed as the composite image or singly, easily and with a small number of procedures.

The image-processing system may further have a correspondence-data-generation section which determines whether or not an identifier of the second-type image is stored in the first-type image retrieved by means of a first retrieval section, and which, on the basis of a result of the determination, generates data pertaining to correspondence between the first-type image and the second-type image. The job-processing section may refer to the data pertaining to correspondence.

The image-processing system may further have a correspondence-data-generation section for generating data pertaining to correspondence between the first-type image and the second-type image when a removable recording medium is connected thereto. The job-processing section may generate the data pertaining to correspondence.

The job-receiving means may collectively receive a plurality of the jobs; and the job-processing means may continuously process the plurality of received jobs.

Generally, in many cases, a plurality of images generated by an image-input apparatus, such as a digital camera, are collectively input into an image-processing system, such as a PC (Personal Computer) or a stand-alone-type printer, and are collectively, continuously printed or continuously displayed on a screen under a single setting condition. Accordingly, as a result of the image-processing system receiving a related setting command for selecting a merging setting for merging the first-type image and the second-type image or a non-merging setting for not merging the first-type image and the second-type image, with regard to a job for causing the output section to continually display a plurality of images, thereby enhancing operability.

The job-receiving means may collectively receive the plurality of jobs—whose objects are the respective plurality of first-type images—for the purpose of printing an index image of the plurality of the first-type images stored in a given area. The job-processing means may continuously process the plurality of received jobs, and cause the output section to print the index image.

According to the image-processing system which receives, with regard to a job for printing an index image, a setting pertaining to whether or not the first-type image forming the index image is to be merged with the second-type image, a user can browse the first-type image stored in a given area in a form of being merged with a second image, or singly.

The job-setting-receiving means may display, in conjunction with the related setting command, a menu for receiving, with regard to said job, a command for setting a processing-condition item different from a processing condition item with which the merging setting or the non-merging setting is to be selected.

As a result of the image-processing system receiving the related setting command for selecting either the merging setting or the non-merging setting by way of the menu for setting a plurality of processing-condition items for displaying an image on the output section, the image-processing system is enhanced in operability.

The job-setting-receiving means may receive, with regard to the jobs of all the first-type images to which the second-type image is related, the related setting command for uniformly selecting either the merging setting or the non-merging setting.

The job-setting-receiving means may receive, with regard to each of jobs of the first-type images to which the second-type image is related, the related setting command for individually selecting either the merging setting or the non-merging setting.

The image-processing system may further have the output section.

A product of an image-processing program causes a computer-for controlling an output section-to function as:
  job-receiving means for receiving a job with regard to a first-type image;
  job-setting-receiving means for receiving a related setting command for selecting, with regard to the job of the first-type image to which a second-type image is related, either a merging setting for merging the first-type image and the second-type image or a non-merging setting for not merging the first-type image and the second-type image; and
  job-processing means serving as job-processing means for processing the received job and which displays, with regard to the job of the first-type image to which the second-type image is not related, the first-type image, and, with regard to the job of the first-type image to which the second-type image is related, either the first-type image, or the composite image of the first-type image and the second-type image on the output section in accordance with either the merging setting or the non-merging setting selected in accordance with the related setting command.

An image-processing method is a method for processing images with use of a computer for controlling an output section, and includes:
  a job-receiving step of receiving a job with regard to a first-type image;
  a job-setting-receiving step of receiving a related setting command for selecting, with regard to the job of the first-type image to which a second-type image is related, either a merging setting for merging the first-type image and the second-type image or a non-merging setting for not merging the first-type image and the second-type image; and
  a job-processing step which processes the received job, and which displays, with regard to the job of the first-type image to which the second-type image is not related, the first-type image, and, with regard to the job of the first-type image to which the second-type image is related, either the first-type image, or the composite image of the first-type image and the second-type image on an display section in accordance with the merging setting or the non-merging setting selected in accordance with the related setting command.

Meanwhile, the respective functions of the plurality of means provided in the invention are implemented by hardware resources whose functions are specified by the configuration per se, hardware resources whose functions are specified by programs, or a combination thereof. In addition, the respective functions of the plurality of means are not limited to those implemented by hardware resources which are physically independent from each other.

BRIEF DESCRIPTION OF THE DRAWINGS

In the accompanying drawings,

FIG. 7 is another schematic diagram according to the first embodiment of the invention;

FIGS. 13A and 13B are schematic diagrams of data according to the first embodiment of the invention;

FIG. 15 is a schematic diagram of data according to the first embodiment of the invention;

FIG. 16 is another schematic diagram of data according to the first embodiment of the invention;

FIG. 17 is another schematic diagram of data according to the first embodiment of the invention;

FIG. 18 is another schematic diagram of data according to the first embodiment of the invention;

DETAILED DESCRIPTIONS OF THE EMBODIMENTS

Figure 1:
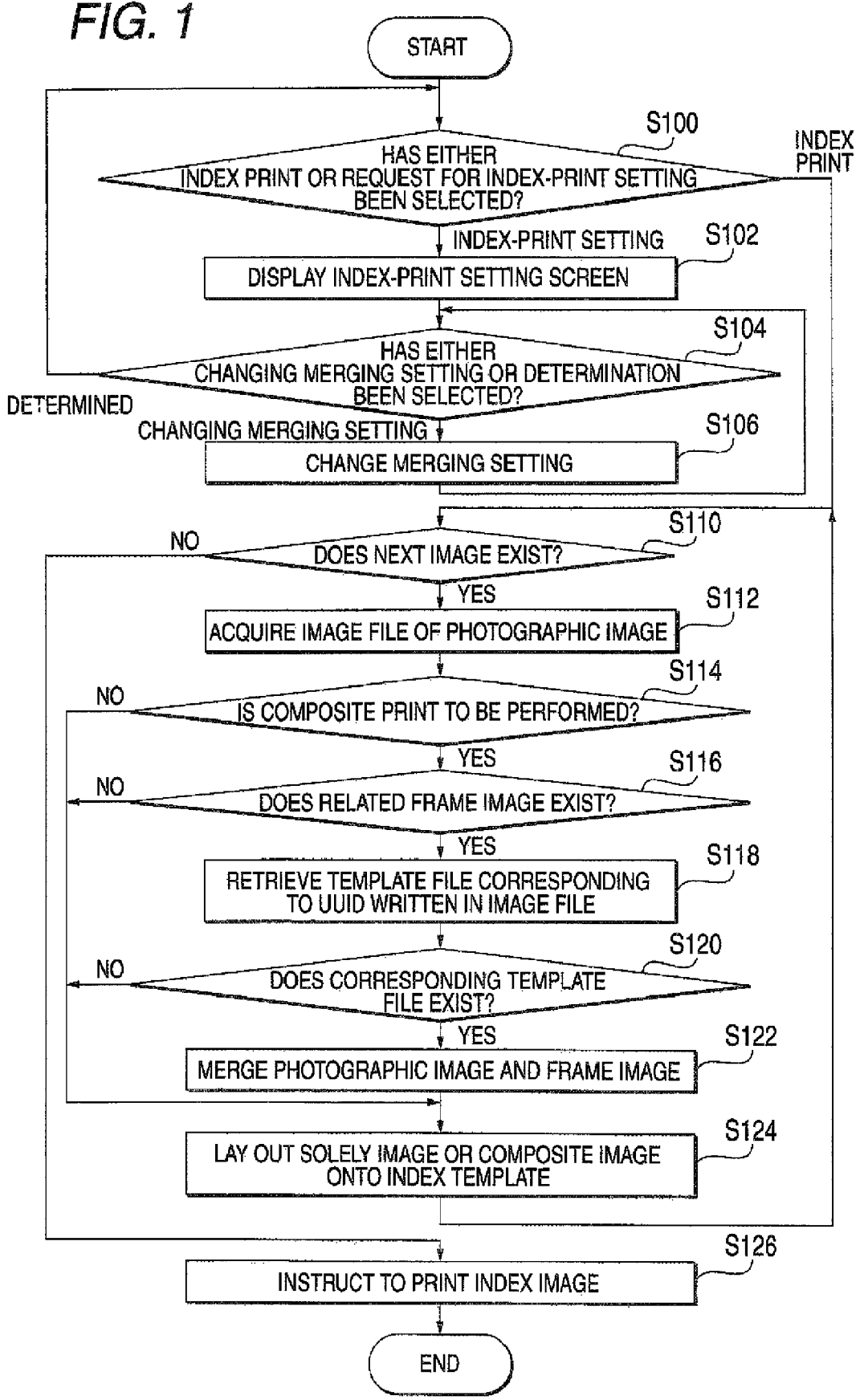
FIG. 1 is a flowchart according to a first embodiment of the present invention.

Hereinbelow, embodiments of the present invention will be described by reference to the accompanying drawings in detail. Constituent elements and processing that are common between the respective embodiments are denoted by the same reference numerals, and repeated descriptions thereof are omitted.

First Embodiment

Figure 2A:
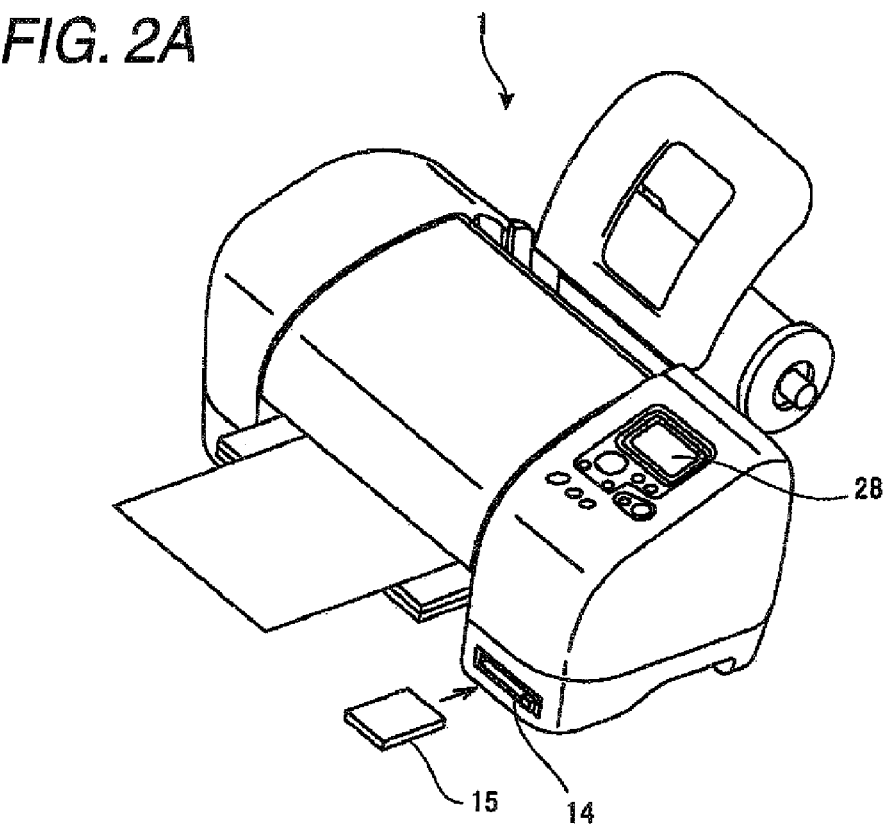
FIG. 2A is a perspective view according to the first embodiment of the invention.
Figure 2B:
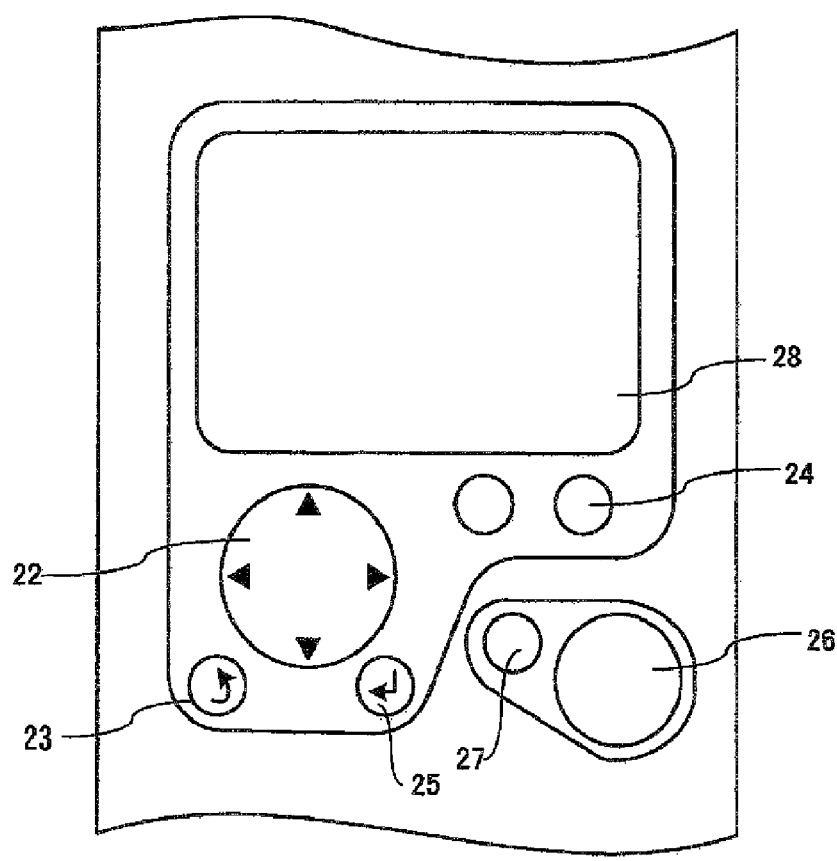
FIG. 2B is an enlarged view of FIG. 2A.

FIG. 2A is a perspective view illustrating the external appearance of a printer 1 serving as a first embodiment of an image processing system; and FIG. 2B is a view illustrating a display section 11 and an operating section 13 of the printer 1 in an enlarged manner. The printer 1 is a so-called stand-alone-type printer which does not require control by a PC, or the like, and which can print a digital image by itself. As illustrated in the drawing, the operating section 13, an LCD 28, a card slot 14, and the like, are disposed on a housing. A variety of operating buttons, such as a cross key 22, an enter button 25, a return button 23, a menu button 24, a print switch 26, and a stop switch 27 are disposed on the operating section 13. A menu for establishing a variety of settings is displayed on the LCD 28, and the displayed menu is operated by the above-described variety of operating buttons. The print switch 26 is a switch for instructing start of printing. The stop switch 27 is a switch for instructing stop of printing. The card slot 14 is an opening for connecting a removable memory 15 to a memory-read-and-write section 40 (see FIG. 3) disposed inside the housing.

Figure 3:
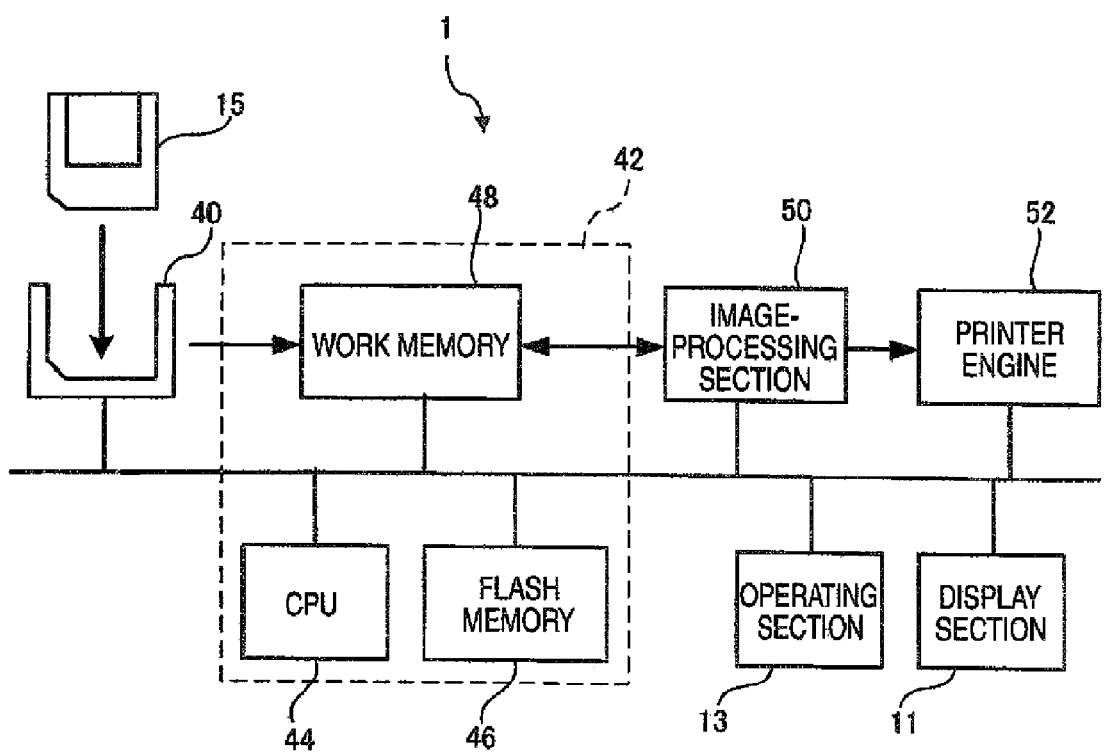
FIG. 3 is a block diagram according to the first embodiment of the invention.

FIG. 3 is a block diagram illustrating the hardware configuration of the printer.

A control section 42 has a CPU 44, a flash memory 46, and a work memory 48. The CPU 44 executes programs stored in the flash memory 46, thereby controlling the entire printer. In addition, the CPU 44 executes a job-execution program stored in the flash memory 46, whereby the control section 42 also functions as job-receiving means, job-setting-receiving means, and job-processing means. In addition, by virtue of executing an image-processing program stored in the flash memory 46, the CPU 44 functions also as first retrieval means, correspondence-data-generation means, and second retrieval means. The flash memory 46 is a memory which stores a variety of programs, such as a job-execution program, and data; and the work memory 48 is a memory which temporarily stores a variety of programs and data. The work memory 48 is used as a memory in which an image processing section 50 temporarily stores data. These various programs and data may be downloaded from a given server by way of a network, to thus be input; alternatively, they may be read from a computer-readable storage medium, such as the removable memory 15, to thus be input.

The memory-read-and-write section 40 has a connection terminal to which the removable memory 15 serving as a storage medium is removably connected, a memory controller, and the like. The memory-read-and-write section 40 is controlled by the control section 42, and functions as the first retrieval means and the second retrieval means. The control section 42 and the memory-read-and-write section 40 constitute the image-processing system. The removable memory 15 is a non-volatile memory, such as a flash memory, which does not lose stored content even after power is turned off. Meanwhile, the removable memory may be a flexible disk, a CD-ROM, or the like. Meanwhile, the printer 1 of the present embodiment makes access to the removable memory 15 attached to the memory-read-and-write section 40; however, alternatively, the printer may be configured to make access to an external memory, such as a hard disk of a PC connected to a network.

The image-processing section 50 is an ASIC for preparing print data on the basis of image data on an object of printing generated by the control section 42. More specifically, in cooperation with the control section 42, the image-processing section performs, e.g., decompression of a digital image compressed in accordance with a JPEG standard, conversion of color space of a decompressed digital image, gamma control, adjustment of color balance, sharpness adjustment, contrast adjustment, resolution conversion for converting a digital image resolution into a print resolution, binarization for binarizing a digital image, interlace processing for generating print data while sorting binarized digital data into a sequence of said digital data being transferred to a printer engine, and the like. Meanwhile, a selection as to whether these processing are to be performed by the control section 42 or by the image-processing section 50 is a design matter which can be made appropriately.

A printer engine 52, serving as an output section, performs printing in accordance with print data generated by the image-processing section 50. The printer engine 52 comprises a carriage on which a print head is mounted, a drive mechanism for reciprocating the carriage, a transport mechanism for transporting printing paper, and the like; and these elements are controlled by the control section 42. In addition to the print head, a plurality of ink tanks for storing ink to be ejected by the print head are mounted, for each color, on the carriage. Meanwhile, the printer engine 52 may perform printing by, e.g., a laser method.

The display section 11 has a display controller, the LCD 28, and the like. The display controller, which is controlled by the control section 42, displays on the LCD 28 a menu and a variety of other information.

Figure 4:
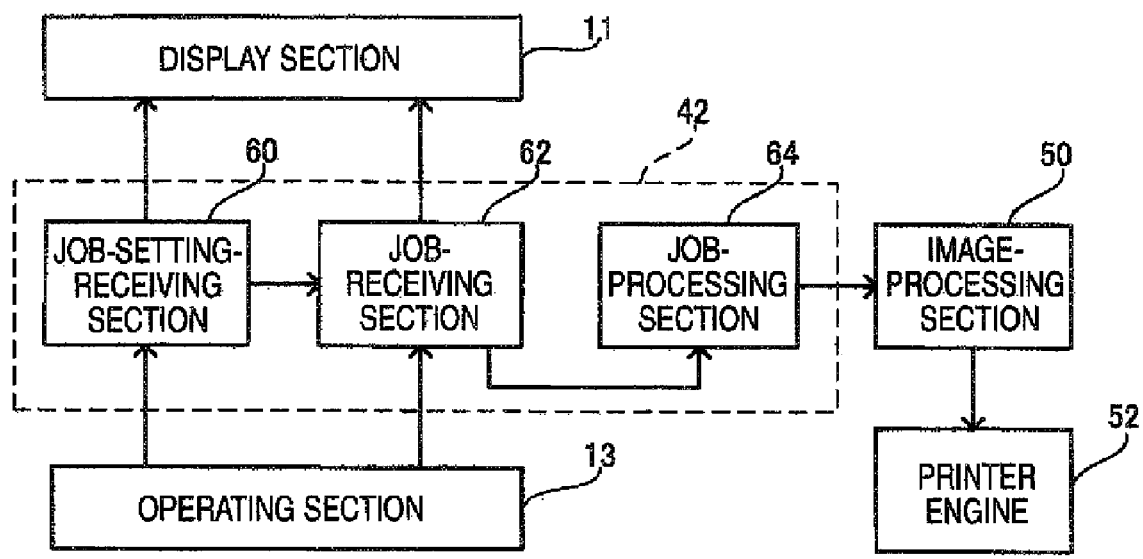
FIG. 4 is a functional block diagram according to the first embodiment of the invention.

FIG. 4 is a functional block diagram illustrating a logical configuration of the printer 1 serving as the first embodiment of the image-processing program of the present invention. In the first embodiment, "index print" for printing an index image of a plurality of photographic images stored in the removable memory 15 will be described. A single job in the first embodiment denotes processing for printing a single photographic image in accordance with an index template. Hereinbelow, this job is called an index print job. However, as will be described later, after generation of an index image in accordance with an index template, the respective index print jobs are integrated into a single print job corresponding to the index image. A job execution program to be executed by the CPU 44 is formed from a job-setting-receiving section 60, a job-receiving section 62, a job-processing section 64, and the like.

The job-receiving section 62 collectively receives index print jobs with regard to all the photographic images stored in the removable memory 15.

The job-setting-receiving section 60 collectively receives an index-print setting with regard to all the index-print jobs received by the job-receiving section 62. The index-print settings include settings, such as a size of printing paper, a type of paper, image quality, and a merging condition. The merging condition referred to here is a processing condition which is set either to a merging setting where printing is performed while an image (hereinbelow, called a "frame image")—which is related to the photographic image to be printed and which represents a decorative frame—is merged, or to a non-merging setting where printing of only the photographic image is performed. In the first embodiment, the index-print setting is uniformly set with regard to all the photographic images, which are objects of the "index print" to be performed. More specifically, according to the present embodiment, the merging condition is uniformly set to all the photographic images which are the objects of the "index print."

The job-processing section 64 acquires an image file corresponding to a photographic image, which is the object of the index print job; and retrieves, from the removable memory 15, a template file defining a frame file related to the image file. The job-processing section 64 generates image data on the object to be printed on the basis of the template file related to the acquired image file. The photographic image referred to here corresponds to a first-type image which is defined in the claims, and the frame image corresponds to a second-type image which is defined in the claims. Meanwhile, there may be employed such a configuration that a job is received with regard to a frame image, and a setting of a merging condition with a photographic image is received with regard to the job of the frame image.

FIG. 1 is a flowchart illustrating an image-processing method according to the first embodiment of the present invention.

Figure 5:
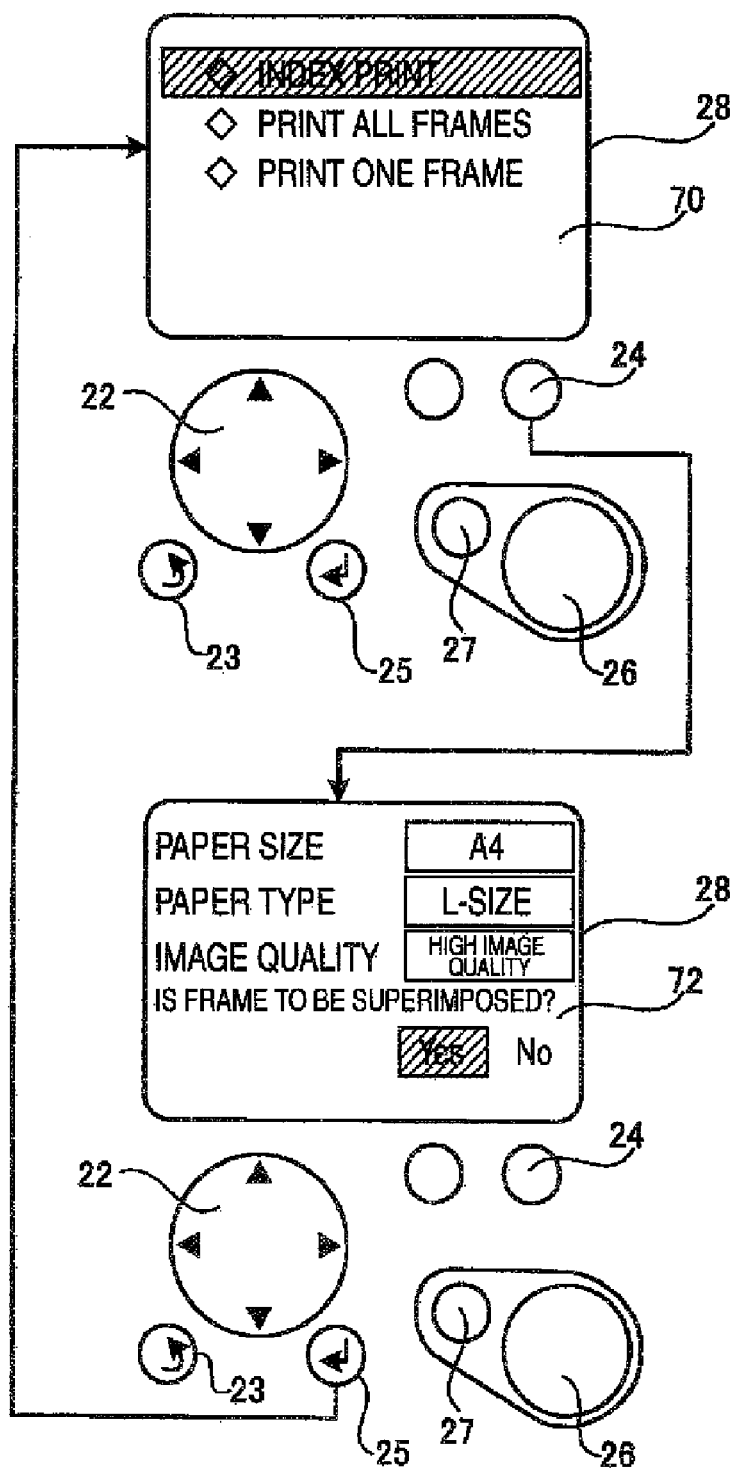
FIG. 5 is a screen-transition diagram according to the first embodiment of the invention.

First, the control section 42 receives an index print job or a request for print setting. More specifically, e.g., the control section 42 waits for a user to operate a button in a situation that a menu screen 70 as illustrated in FIG. 5 is displayed on the LCD 28. When a user operates the cross key 22 to select "index print" on the menu screen 70, and presses the print switch 26, the control section 42 collectively receives index print jobs with regard to all the image files of a given format stored in a given directory in the removable memory 15. In addition, when the user presses the menu button 24 in a situation that the menu screen 70 is displayed on the LCD 28, the control section 42 receives a request for print setting (step S100).

Next, the control section 42 receives a related setting command. More specifically, upon receipt of a request for print setting, the control section 42 waits for a user to operate a button in a situation where an index-print-setting screen 72 as illustrated in FIG. 5 is displayed on the LCD 28 (steps S102, S104). When the user operates the cross key 22 to change a merging condition on the index-print-setting screen 72, and presses the enter button 25, the control section 42 receives the operation as a command for establishing related settings. Upon receipt of the related setting command, the control section 42 changes the merging condition stored within the work memory 48 (step S106), and displays the menu screen 70.

Next, the control section 42 starts generation of an index image. More specifically, when a user operates the cross key 22 on the menu screen 70 to select "index print," and presses the print switch 26 (step S100), the control section 42 proceeds to processing in steps S110 and subsequent thereto, and generates an index image.

In step S110 and step S112, the control section 42 reads photographic images sequentially. More specifically, the control section 42 controls the memory-read-and-write section 40 to thus sequentially read into the work memory 48 image files of a given format stored in a given directory in the removable memory 15, and performs processing in steps S114 and subsequent thereto with regard to the respective image files. For instance, the control section 42 sequentially reads into the work memory 48 image files of a JPEG format stored in a given directory.

Next, the control section 42 makes a determination with regard to the merging condition. More specifically, the control section 42 refers to the merging condition stored in the work memory 48; and if the merging condition is a merging setting, processing proceeds to step S116, and if the merging condition is a non-merging setting, processing proceeds to step S124 (step S114).

Next, the control section 42 makes a determination of presence/absence of a related frame image with regard to each of the image files. For instance, the control section 42 refers to a UUID written in each of the image files, and if the UUID is written, determines that a related frame image exists, and if the UUID is not written, determines that no related frame image exists (step S116).

Figure 6:
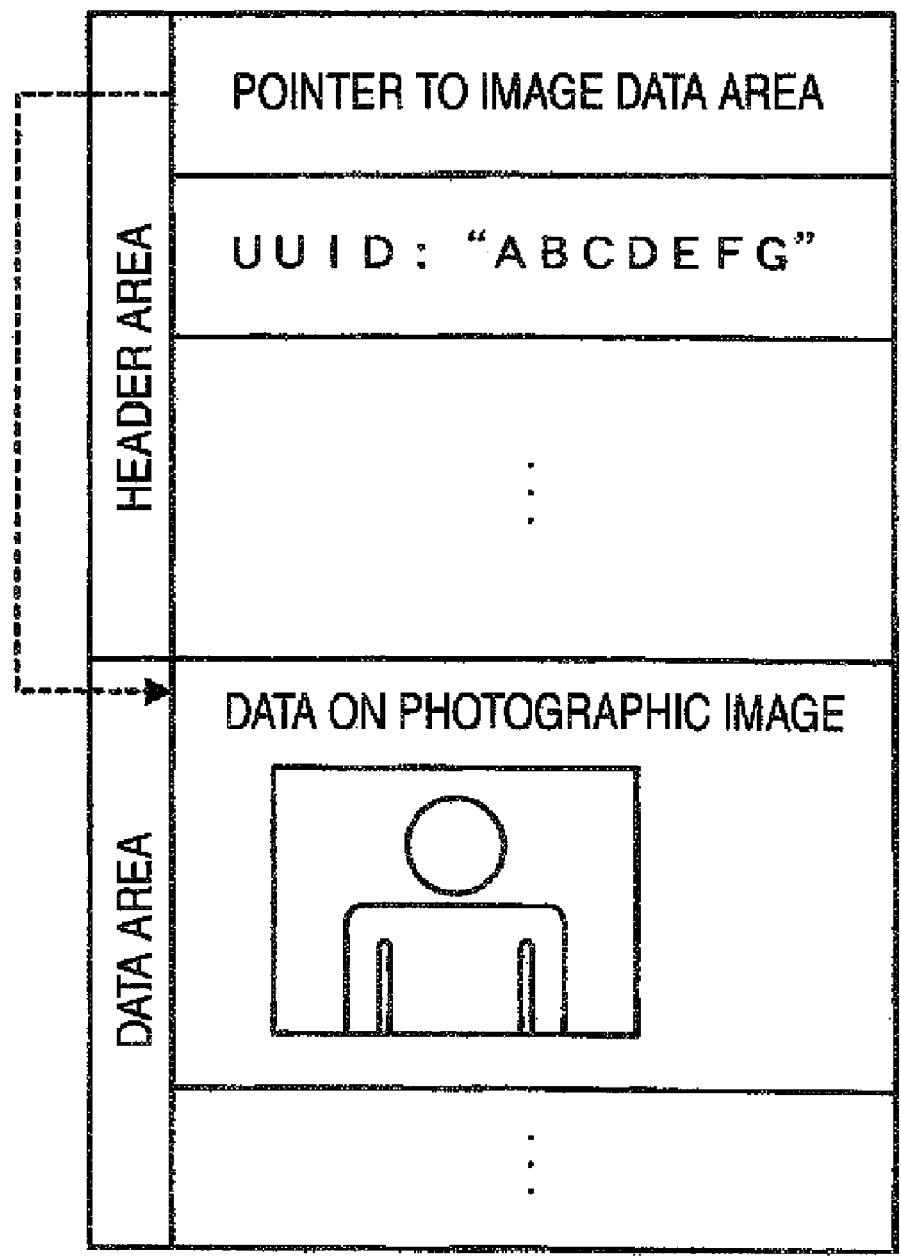
FIG. 6 is a schematic diagram according to the first embodiment of the invention.

In general, a pointer representing a starting address of an image data area corresponding to the photographic image, the date when the file was created, an image size, and the like, are recorded in a header area of an image file generated by a digital camera as illustrated in FIG. 6. In general, in addition to the above information, arbitrary information can be recorded in the header area of the image file. Accordingly, data for relating the photographic image to a frame image, and a pointer representing a starting address of a data area corresponding to the photographic image can be stored in the header area. Hereinbelow, an embodiment where data for relating a frame image to a photographic image is a UUID of a template file will be described. For instance, when a UUID having been affixed in advance to a template file of a frame image, which has been specified at a time of photographing by a digital camera, is stored in an image file, the template file is related to the image file. Since the UUID is a numerical value that is assured to be unique, by means of using a UUID as an identifier, a template file can be specified uniquely. Meanwhile, in a case where the template file can be specified uniquely on the basis of a file name or a path name of the template file, a relation between an image file and the template file may be established by means of storing the file name or the path name of the template file into the header area of the image file. Alternatively, a template file related to an image file may be specified by means of referring to a relation-establishing file in which data for associating an image file and a template file have been written in advance and which has been recorded in advance. An essential requirement for a file format of the image file is to be a format which can store arbitrary additional data; and examples of an employable file format include a TIFF format and an Exif format.

Next, the control section 42 retrieves a template file. More specifically, the control section 42 retrieves, from the removable memory 15, a template file corresponding to the UUID written in the image file, thereby making a determination of presence/absence of the corresponding template file (step S118 and step S120). As illustrated in FIG. 7, a UUID, a size of printing paper (e.g., "postcard"), data for specifying an orientation of the printing paper (e.g., "portrait layout"), and the like, are recorded in the header area of the template file. Data for specifying a playback format of the photographic image and the frame image are recorded in a data area of the template file. The data for specifying the playback format are, more specifically, data for specifying a position where the photographic image is to be rendered, data for specifying a position where the frame image is to be rendered, a path name for an image data file of the frame image, and the like. Meanwhile, the image data pertaining to the frame image may be recorded by means of recording compressed image data within the template file rather than recording the path name of the file. Here, if the corresponding template file exists, the control section 42 proceeds to processing pertaining to step S122; and if the corresponding template file does not exist, proceeds to processing pertaining to step S124.

Figure 8A:
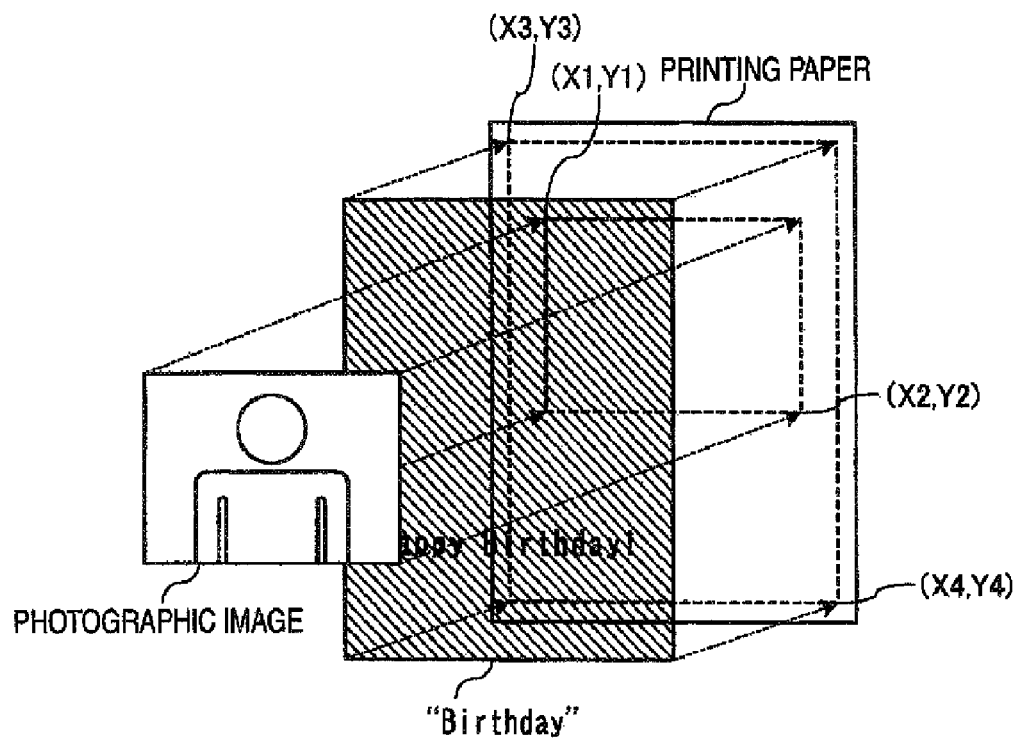
FIG. 8A is a schematic diagram for describing printing according to the first embodiment of the invention.
Figure 8B:
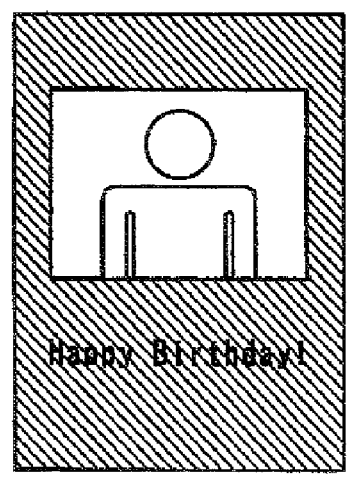
FIG. 8B is a schematic diagram illustrating a result of printing according to the first embodiment of the invention.

When the template file corresponding to the UUID written in the image file exists, the control section 42 merges the frame image with the photographic image (step S122). The photographic image and the frame image is merged in accordance with the template file retrieved in step S118. More specifically, the control section 42 lays out the frame image, in an enlarged or reduced manner, on a frame-image-rendering area specified by the template file. For instance, as illustrated in FIGS. 8A and 8B, the control section 42 lays out a frame image with a file name of "Birthday" on the frame-image-rendering area whose upper-left coordinate is (X3, Y3), and whose lower-right coordinate is (X4, Y4). In addition, the control section 42 lays out the photographic image in an enlarged or reduced manner, on the frame-image-rendering area specified by the template file. For instance, the control section 42 lays out the photographic image on a rectangular area whose upper-left coordinate is (X1, Y1), and whose lower-right coordinate is (X2, Y2).

Next, the control section 42 lays out an image to be printed in accordance with the index template (step S124), and returns to processing pertaining to step S110. When the merging condition is a merging setting, the image to be printed is a composite image of the frame image and the photographic image; and when the merging condition is a non-merging setting, the image to be printed is solely the photographic image. The index template is data for specifying a plurality of rendering areas for the purpose of laying out respective images to be printed on a printing paper during index printing. The control section 42 repeats processing from step S110 to S124, thereby sequentially laying out images to be printed on rendering areas of the index template, to thus generate an index image.

Finally, the control section 42 instructs the image-processing section 50 to print the index image, and causes the printer engine 52 to print the index image (step S126). At this timing, the index print jobs with respect to the respective photographic images are integrated into a print job with respect to a single index image.

Figure 9:
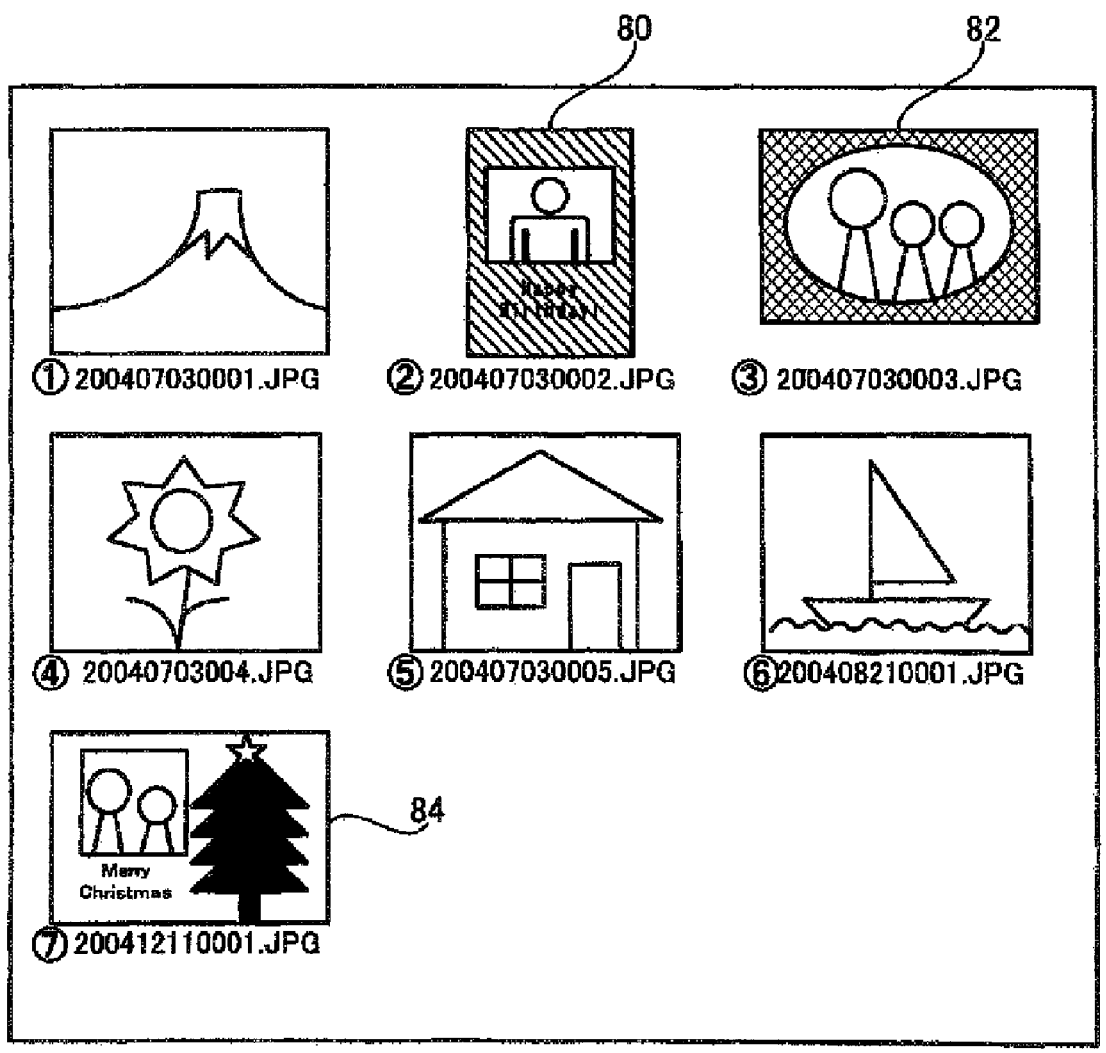
FIG. 9 is another schematic diagram according to the first embodiment of the invention.
Figure 10:
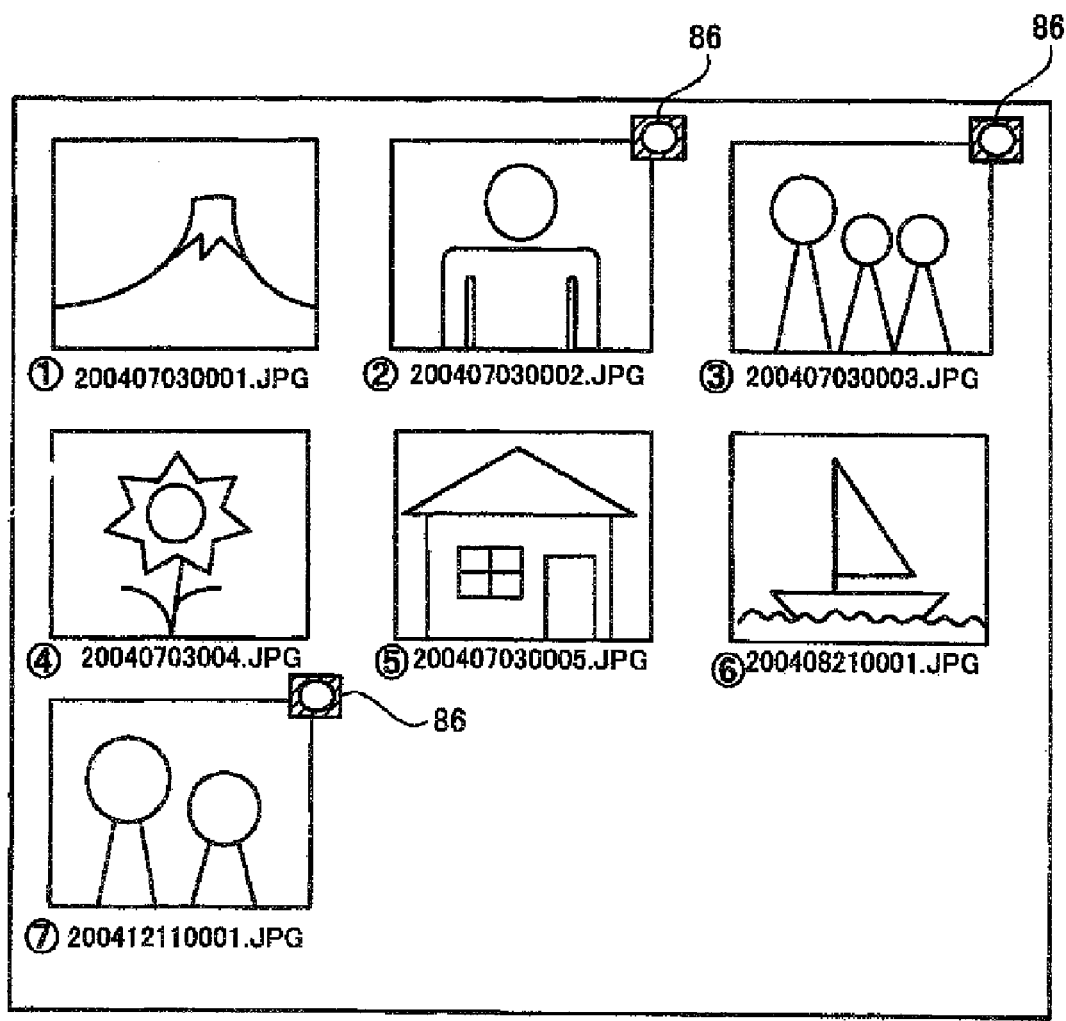
FIG. 10 is another schematic diagram according to the first embodiment of the invention.

FIG. 9 is a schematic diagram illustrating a print result of an index image of a case where the merging condition is a merging setting. In the illustrated example, each of images 80, 82, and 84 is a composite image of a photographic image and a frame image. FIG. 10 is a schematic diagram illustrating a print result of an index image of a case where the merging condition is a non-merging setting. A mark 86 indicating existence of a related frame image may be laid out on an index image to be printed under a non-merging setting.

Next, descriptions about the image-processing program will be provided.

Figure 11:
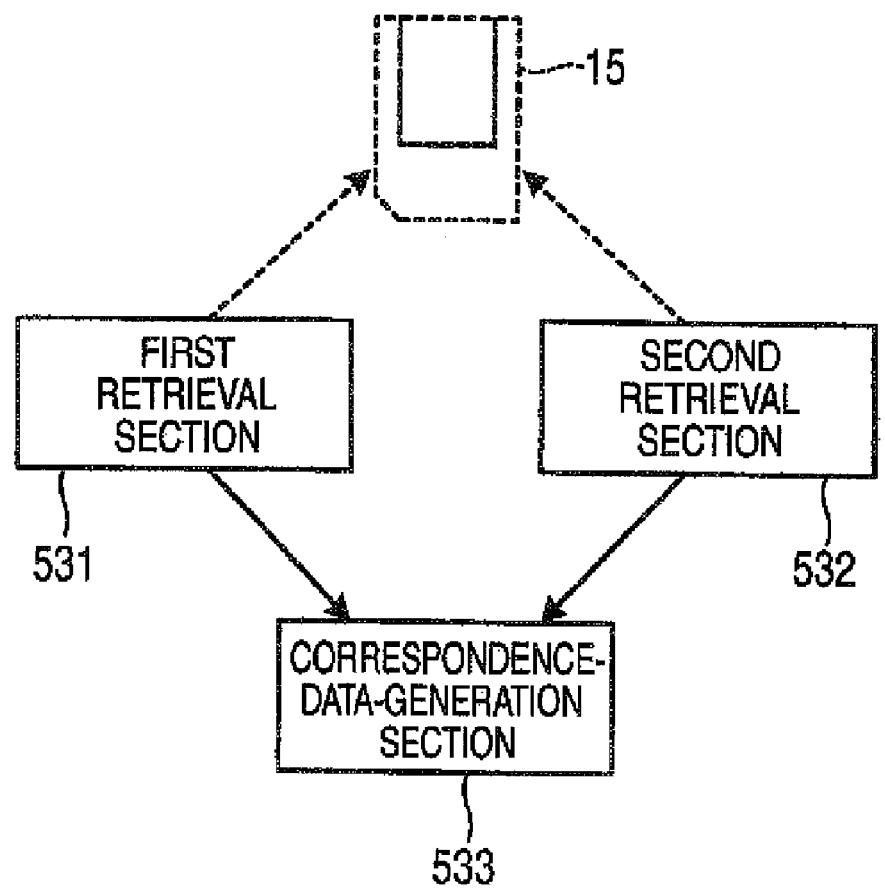
FIG. 11 is a block diagram of a file-processing program according to the first embodiment of the invention.

FIG. 11 is a block diagram illustrating a logical configuration of the image-processing program. The image-processing program has a first retrieval section 531, a second retrieval section 532, and a correspondence-data-generation section 533.

The first retrieval section 531 retrieves an Exif file from the removable memory. More specifically, the first retrieval section 531 finds an image file whose extension is ".exif" while tracing subordinate directories in sequence from a given directory-serving as a starting point-of the removable memory 15. Upon finding the image file whose extension is ".exif," the first retrieval section 531 outputs a path to the Exif file to the correspondence-data-generation section 533. By means of repeating this processing with regard to all the subordinate directories, all the Exif files stored under the directory serving as the starting point are retrieved.

The second retrieval section 532 also retrieves, from the removable memory 15, a template file in a similar manner. More specifically, the second retrieval section 532 finds a file whose extension is ".usd," which is assigned to a template file while tracing subordinate directories in sequence from a given directory—serving as a starting point—of the removable memory 15. Upon finding the image file whose extension is ".usd," the second retrieval section 532 outputs a path to the file to the correspondence-data-generation section 533. By means of repeating this processing with regard to all the subordinate directories, all the template files stored under the directory serving as the starting point are retrieved.

The correspondence-data-generation section 533 determines whether or not a UUID is included in the Exif file retrieved by means of the first retrieval section 531; and, on the basis of the determination result, generates data pertaining to correspondence between the Exif file and the template file; more specifically, creates a table which brings the Exif file into correspondence with the template file. The "data pertaining to correspondence" defined in claims correspond to the table created by the correspondence-data-generation section 533.

Next, a flow in processing pertaining to the image-processing program will be described. In the first embodiment, a table is created when the removable memory 15 is connected.

When the table has not been created at a time when a confirmation as to whether or not an image file is related to a template file is attempted, a user must wait until the table is created. Accordingly, in order to minimize a possibility of causing a user to wait, a table is preferably created as early as possible; that is, when the removable memory 15 is connected.

Figure 12:
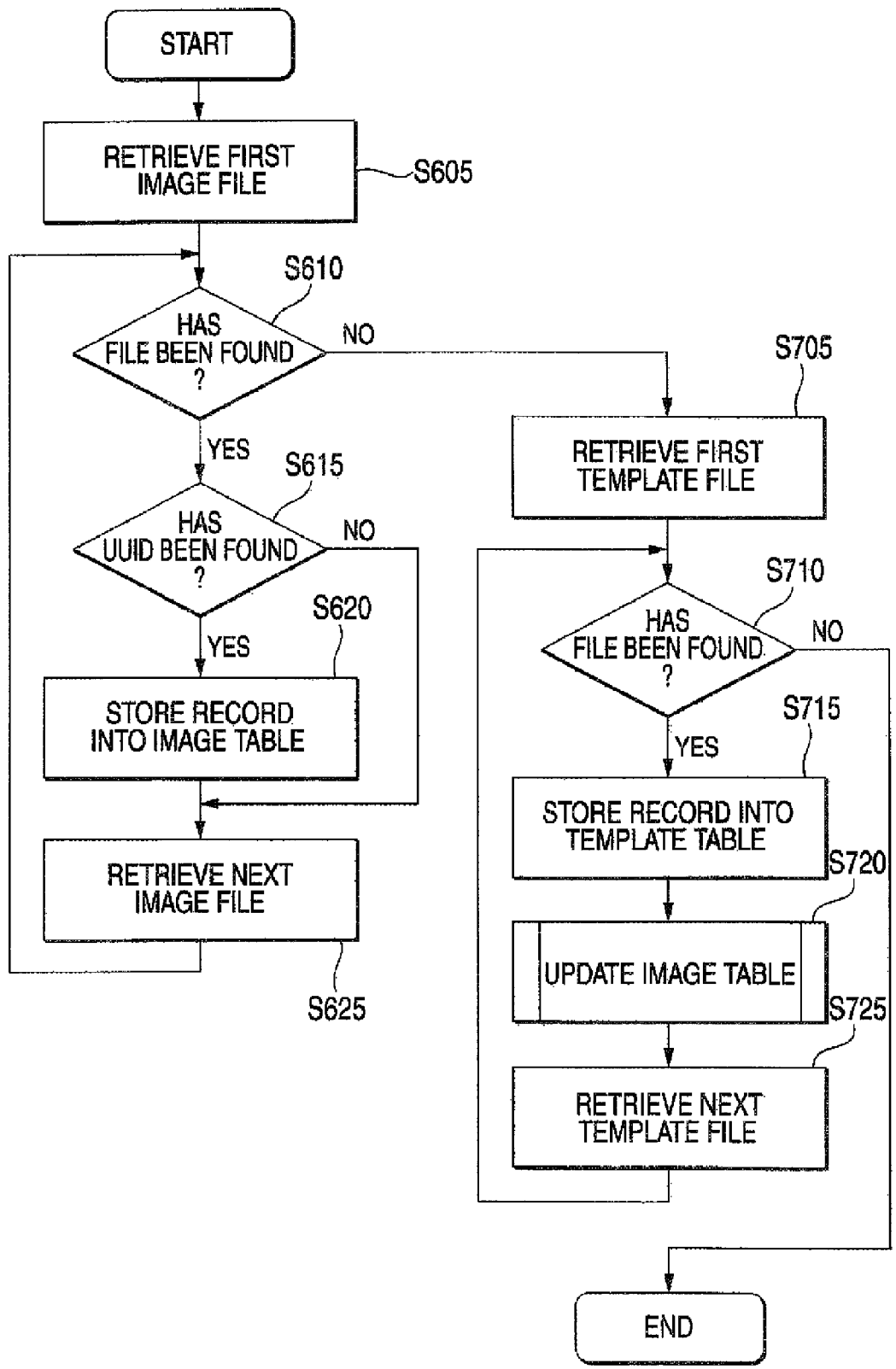
FIG. 12 is a flowchart according to the first embodiment of the present invention.

FIG. 12 is a flowchart illustrating a flow of processing pertaining to the image-processing program.

In S605, a first Exif file is retrieved. More specifically, when a user connects the removable memory 15 to the memory-read-and-write section 40, a predetermined interrupt occurs in the OS; and upon occurrence of the interrupt, the OS calls up the correspondence-data-generation section 533. Upon the callup, the correspondence-data-generation section 533 provides the first retrieval section 531 with a command for execution. Upon provision of the command for execution, the first retrieval section 531 repeats retrieval until the first Exif file is found while tracing subordinate directories in sequence from a given directory serving as a starting point, or until reaching the last directory.

In S610, if an Exif file is found, the first retrieval section 531 proceeds to S615; and if an Exif file is not found, the first retrieval section 531 proceeds to S705. In S615, the correspondence-data-generation section 533 determines whether or not a UUID is included in the found Exif file. More specifically, the first retrieval section 531 outputs, to the correspondence-data-generation section 533, a path to the thus-found Exif file. The correspondence-data-generation section 533 reads the Exif file specified by the path output from the first retrieval section 531, and determines whether or not a UUID is recorded therein. If a UUID is recorded, processing proceeds to S620; and if no UUID is recorded, processing proceeds to S625.

In S620, the correspondence-data-generation section 533 stores into an image table, which will be described now, file data pertaining to the Exif file, and the UUID. FIG. 13A is a schematic diagram illustrating an example image table. An image table G comprises a file data string 61a for storing data by which an Exif file can be uniquely specified; a UUID string 61b for storing UUIDs included in Exif files, and a template ID string 61c for storing template ID. The data by which an Exif file can be uniquely specified are, e.g., a file name or a path name of the Exif file. The template ID is a code for bringing a record in the image table G into correspondence with a record of a template table, which will be described later; and at this time point, the template ID is not yet assigned.

In S625, the correspondence-data-generation section 533 instructs the first retrieval section 531 to retrieve a next Exif file.

By means of repeating the above-described processing, all the Exif files stored in the subordinate directories are retrieved. When all the Exif files have been retrieved, the last directory is reached while no Exif file is found through retrieval in the subsequent execution of S625, thereby making a determination that no Exif file has been found in S610, and proceeding to S705.

In S705, a first template file is retrieved. More specifically, the correspondence-data-generation section 533 provides the second retrieval section 532 with a command for execution. Upon provision of the command for execution, the second retrieval section 532 repeats retrieval until the first template file is found while tracing subordinate directories in sequence from a given directory serving as a starting point, or until reaching the last directory.

In S710, if a template file is found, the second retrieval section 532 proceeds to S715; and if no template file is found, terminates processing.

In S715, the correspondence-data-generation section 533 stores into the template table, which will be described next, the template ID, file data pertaining to the template file, the UUID, and data pertaining to a display layout.

FIG. 13B is a schematic diagram illustrating an example template table. A template table T comprises a template ID string 71a for storing the template IDs; a UUID string 71b for storing the UUIDs included in template files, a file data string 71c for storing data by which the template files can be uniquely specified; and a display layout string 71d for storing data pertaining to display layouts included in the template files. The data by which a template file can be uniquely specified are, e.g., a file name or a path name of the template file. The data pertaining to a display layout are, more specifically, a paper size, orientation of paper, and the like. The data to be stored into the display layout string 71d can be selected appropriately. When data pertaining to display layouts have been stored, in a case where, e.g. a template file for performing printing on printing paper of A4 size is to be found, the template file can be found within a short period of time by means of referring to the template table T. When a record is to be added to the template table T, a template ID for allowing unique identification of the record is generated, and stored in the template ID string 71a. When the template table T has been generated, in a case where a template file is related to an Exif file, confirmation can be made even as to which template file is related to the Exif file. Accordingly, when an Exif file to which a template file is related is selected, the template file related to the Exif file can be specified within a short period of time by means of referring to the template table T, thereby shortening time from selection of the Exif file to start of printing.

In S720, the correspondence-data-generation section 533 updates the template ID string 61c of the image table G. Descriptions about processing pertaining to S720 will be provided later in detail.

In S725, the correspondence-data-generation section 533 instructs the second retrieval section 532 to retrieve a next template file.

By means of repeating the above-described processing, all the template files stored in the subordinate directories are retrieved. When all the template files have been retrieved, in retrieval in the subsequent execution of S725, the last directory is reached while no template file is found, whereby a determination is made in S710 that no template file has been found, and processing is terminated.

Next, descriptions of processing in S720 will be provided.

Figure 14:
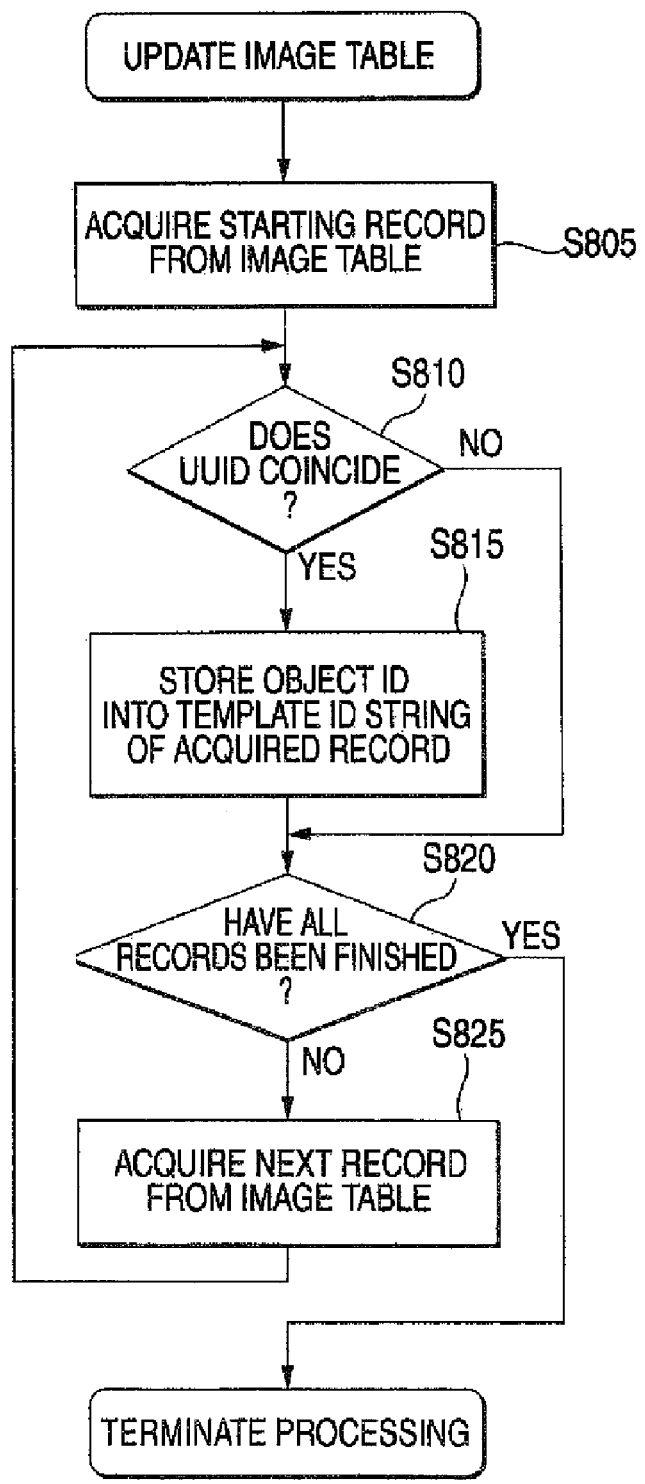
FIG. 14 is a flowchart according to the first embodiment of the present invention.

FIG. 14 is a flowchart illustrating a flow of processing in S720.

In S805, a starting record is acquired from the image table G.

In S810, a determination is made as to whether or not a UUID stored in the acquired record coincides with the UUID found in S705 or S725. In a case of coincidence, processing proceeds to S815; and in a case of non-coincidence, processing proceeds to S820.

In S815, an object template ID of the acquired record is stored in the template ID string 61c. The object template ID referred to here is a template ID imparted to a record corresponding to the template file found in S705 or S725.

In S820, a determination is made as to whether or not selection of all the records stored in the image table G has finished. If the selection is not finished, processing proceeds to S825, and processing is repeated until selection of all the records finishes. If the selection is finished, processing is terminated.

As a result of the above processing, in the image table G, the same template ID as that of the template file found in S705 or S725 is stored in the record having the same UUID as that of the template file.

FIG. 15 is a schematic diagram illustrating a finally-created table. As illustrated in the drawing, records in the image table G and records in the template table T are brought into correspondence by way of the template IDs. Since an image file is brought into correspondence with the template file related thereto, by means of referring to the image table G and the template table T, confirmation can be made as to which template file is related to an image file. Meanwhile, as is apparent from FIG. 15, a correspondence of records can also be established by reference to UUIDs.

According to the printer 1 according to the above-described first embodiment of the invention, there is created a table for bringing respective Exif files stored in the removable memory 15 into correspondence with template files related thereto. Therefore, when, e.g., a list of file names of image files to which template files are related is to be displayed, by means of referring to the created table, a determination can be made as to whether or not a template file is related to each of the Exif files within a short period of time, whereby the list of the file names can be displayed in a short period of time. Therefore, even in a case where a plurality of image files are present, a user can confirm whether or not a template file is related to each of the image files within a short period of time.

Meanwhile, in the first embodiment, data are divided into the image table G and the template table T; however, as illustrated in FIG. 16, creation into a single table is also applicable. In this case, the template ID string is negated.

In addition, the present embodiment has been described while taking a case where in which the printer 1 is employed as an image display apparatus having a file-processing device as an example; however, the image-display system may be included in a personal computer, a digital camera, a cellular phone, a PDA, or the like.

In addition, the present embodiment has been described while taking a case in which a composite image is to be printed as an example; however, another configuration in which a composite image is to be displayed on the LCD 28 is also applicable.

FIG. 17 is a schematic diagram illustrating the "data pertaining to correspondence." As illustrated in the drawing, the "data pertaining to correspondence" are in the form of a table for bringing each image file into correspondence with presence/absence of an identifier. When correspondence is made with presence/absence of an identifier, a determination can be made as to whether or not a template file is related to the image file. An essential requirement is to be capable of confirming, within a short period of time, whether or not a template file is related to an image file; accordingly, when confirmation to such an extent as to which template file is related to an Exif file is not required, a sufficient requirement is to create a table illustrated in FIG. 17. Since the table illustrated in FIG. 17 can be created only through retrieval of image files, and retrieval of template files are not required, creation of the same can be achieved within a short period of time.

FIG. 18 is another schematic diagram illustrating the "data pertaining to correspondence." As illustrated in the drawing, the "data pertaining to correspondence" are in the form of a table for bringing each of the image files into correspondence with an identifier. Since the example table illustrated in FIG. 18 can be also created without retrieving template files, creation of the same can be achieved within a short period of time. In the example illustrated in FIG. 18, identifiers of template files are brought into correspondence; accordingly, when image files are to be printed on the basis of template files, the template files in correspondence with the respective image files can be specified in a shorter period of time as compared with the example illustrated in FIG. 17.

As described above, according to the first embodiment of the invention, a user can establish a setting as to whether or not a photographic image is to be printed while being merged with a frame image, or as solely a photographic image without being merged, in a mode for setting print conditions with regard to index print, such as a paper size, easily and by a small number of procedures. Accordingly, according to the first embodiment of the invention, a user can browse all the image files of a given format stored in a given directory in the removable memory 15 in the form of composite images with the respective frame images, or browse the same singly, with a simple operation.

In addition, in the printer 1, merging conditions for all the photographic images to be continuously printed can be collectively set by means of setting a merging condition once.

Second Embodiment

Next, a second embodiment of the invention, in which processing for printing a single photographic image stored in the removable memory 15 in accordance with a merging condition is processed as a single job, will be described. Hereinbelow, this job is called an individual-print job.

Figure 19:
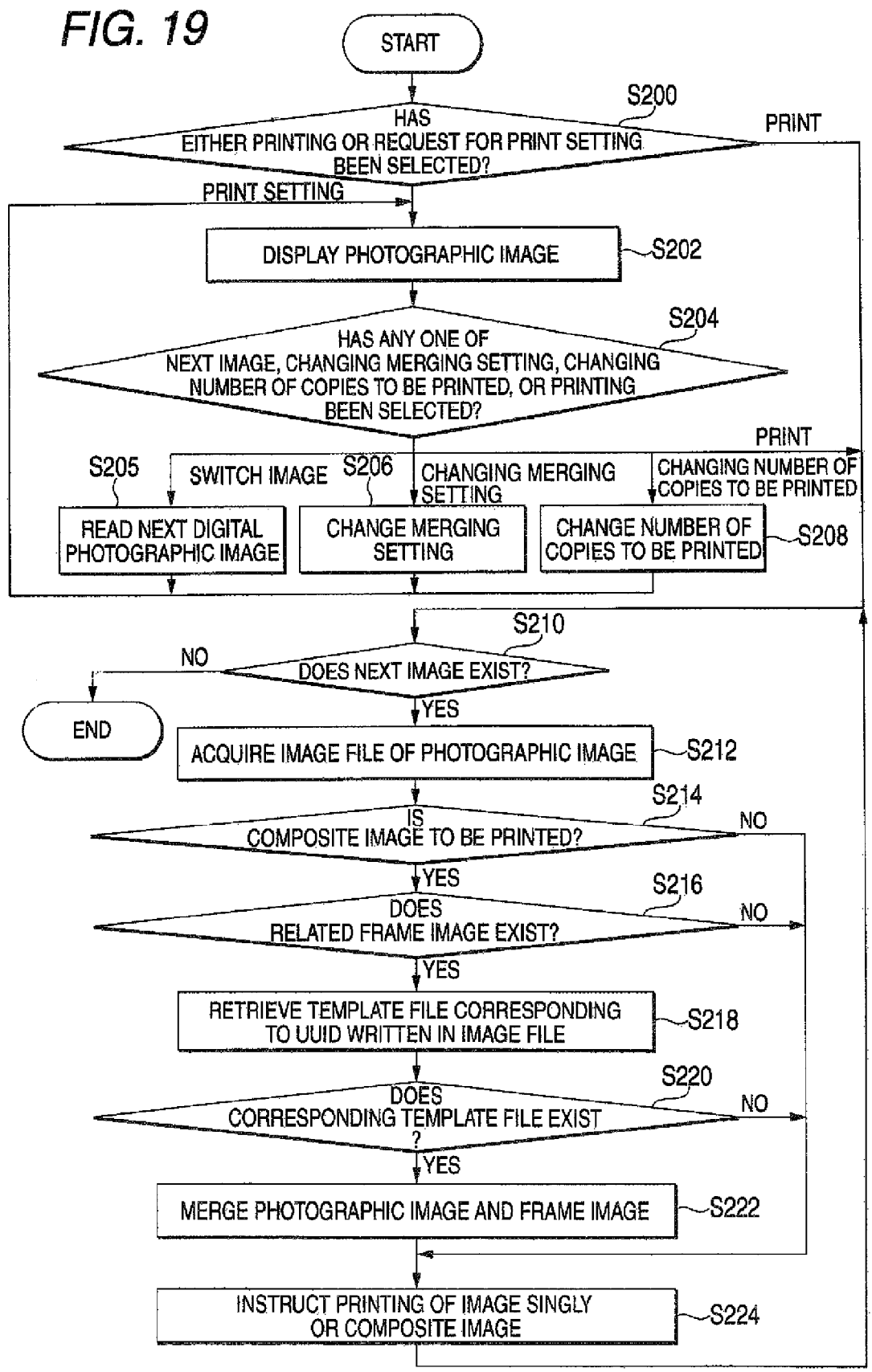
FIG. 19 is a flowchart according to a second embodiment of the present invention.

FIG. 19 is a flowchart illustrating an image-processing method according to the second embodiment of the present invention.

Figure 20:
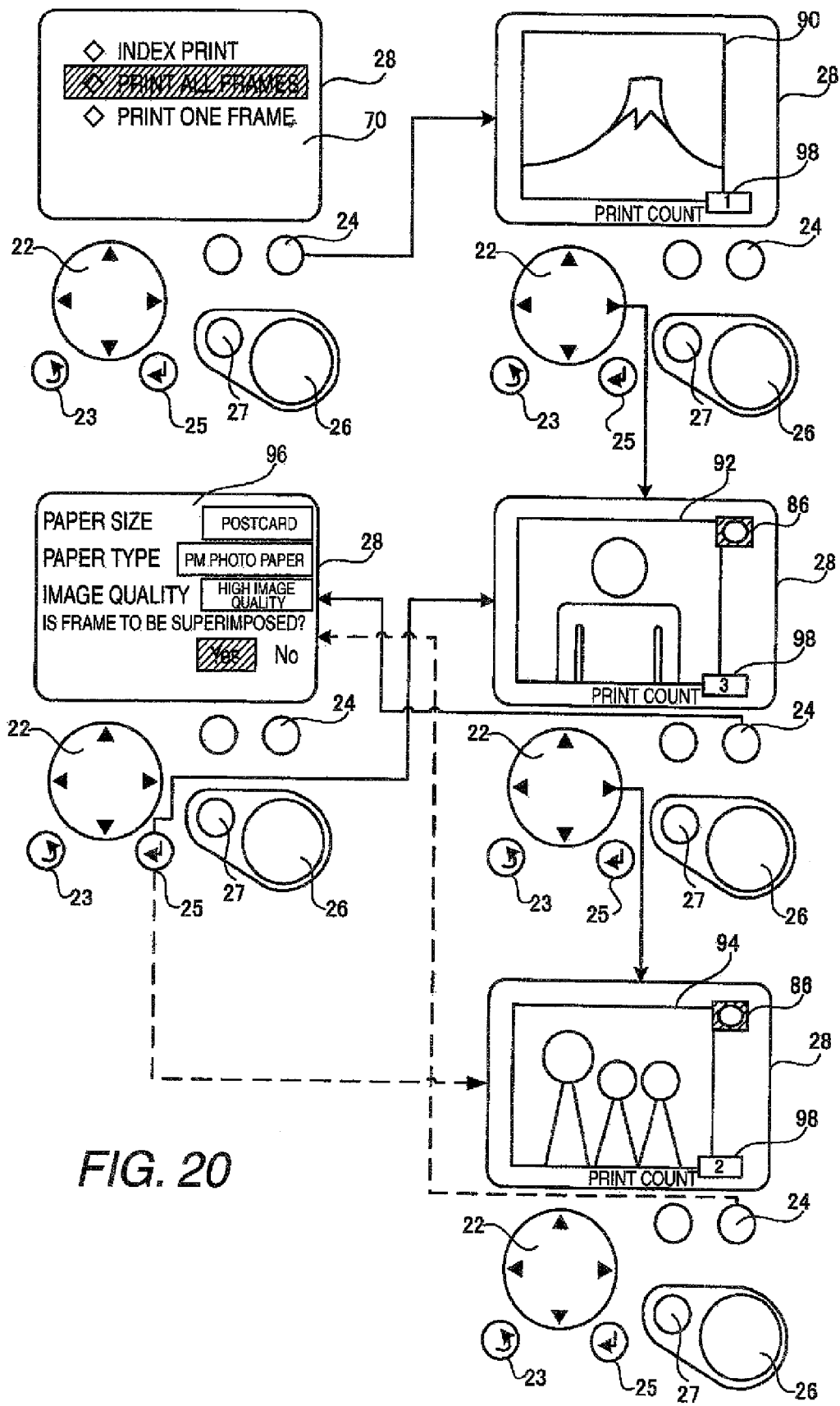
FIG. 20 is a screen-transition diagram according to the second embodiment of the invention.

First, the control section 42 receives an individual print job or a request for print setting. More specifically, the control section 42 waits for a user to operate a button in a situation where, e.g., the menu screen 70 illustrated in FIG. 20 is displayed on the LCD 28. When a user operates the cross key 22 to select "print all frames" on the menu screen 70, and presses the print switch 26, the control section 42 receives individual print jobs pertaining to the image files of a given format stored in a given directory in the removable memory 15, and proceeds to processing pertaining to step S210. At this time, the individual-print jobs with regard to all the image files whose numbers of copies to be printed are set to one or more are collectively received. In addition, when the user presses the menu button 24, the control section 42 receives a request for print setting (step S200).

Upon receipt of the request for print setting, the control section 42 causes the user to select photographic images which are objects of the print setting (steps S202, S204, and step S205). More specifically, e.g., photographic images 90, 92, and 94 (see FIG. 20) corresponding to image files of a given format stored in a given directory in the removable memory 15 are sequentially displayed on the LCD 28 in accordance with operations by a user of pressing the right end and left end of the cross key 22.

When photographic images, which are objects of the print setting, are selected, the control section 42 receives a request for changing the merging condition. More specifically, when the menu button 24 is pressed on the screen where the photographic images 90, 92, and 94 are displayed on the LCD 28, the control section 42 displays a print-setting screen 96 on the LCD 28. Furthermore, when the user operates the cross key 22 to thus change the merging condition, and presses the enter button 25, the control section 42 receives the operation as a related setting command with regard to the photographic images, which are the objects of the print setting. Upon receipt of the related setting command, the control section 42 changes the merging conditions of corresponding photographic images stored within the work memory 48 (step S206), and returns to processing pertaining to S202. In the second embodiment, merging conditions for the respective photographic images are stored in the work memory 48. Thus, according to the second embodiment, merging settings of the respective photographic images can be set individually. In step S202, the control section 42 displays a photographic image displayed immediately before the print-setting screen 96 on the LCD 28.

In addition, the control section 42 changes a setting of the numbers of copies to be printed for the photographic images which are the objects of the print setting. More specifically, in a situation where the photographic images 90, 92, and 94 are displayed on the LCD 28, when the user presses the upper end or the lower end of the cross key 22, the control section 42 receives the request for changing the number of copies to be printed with regard to the photographic images displayed on the LCD 28, thereby increasing/decreasing a numerical value within a print-count-setting box 98, and changing the setting of the number of copies to be printed with regard to the photographic images which are the objects of the print setting (step S208).

In addition, the control section 42 receives an individual-print job. More specifically, when the print switch 26 is pressed in a situation where the photographic images 90, 92, 94, and the like, are displayed on the LCD 28 (step S204), the control section 42 receives individual-print jobs with regard to image files of a given format stored in a given directory in the removable memory 15. At this time, individual-print jobs with regard to all the image files whose numbers of copies to be printed are set to more than one are collectively received.

Hereinbelow, the individual-print job will be described.

Upon receipt of the individual-print job, the control section 42 controls the memory-read-and-write section 40 to thus sequentially read into the work memory 48 image files of a given format stored in a given directory in the removable memory 15, and performs processing in steps S214 and subsequent thereto with regard to the respective image files (step S210, step S212).

In step S214, the control section 42 makes a determination as to the merging condition. More specifically, the control section 42 refers to a merging setting stored in the work memory 48; and if the merging setting is stored, proceeds to processing pertaining to step S216, and if a non-merging setting is stored, proceeds to processing pertaining to step S224.

Next, with regard to each of the image files, the control section 42 makes a determination of presence/absence of a related frame image. For instance, the control section 42 refers to a UUID written in the image file; and if the UUID is written, a determination is made that a related frame image exists, and if the UUID is not written, a determination is made that no related frame image exists (step S216).

Next, the control section 42 retrieves a template file. More specifically, the control section 42 retrieves, from the removable memory 15, a template file corresponding to the UUID written in the image file, thereby making a determination of presence/absence of the corresponding template file (step S218 and step S220). Here, if the corresponding template file exists, the control section 42 proceeds to processing pertaining to step S222; and if the corresponding template file does not exist, proceeds to processing pertaining to step S224.

When the template file corresponding to the UUID written in the image file exists, the control section 42 merges the frame image and the photographic image (step S222). The frame image and the photographic image are merged in accordance with the template file retrieved in step S218. More specifically, the control section 42 lays out the frame image in an enlarged or reduced manner, on a frame-image-rendering area specified by the template file. In addition, the control section 42 lays out the photographic image in an enlarged or reduced manner, on the frame-image-rendering area specified by the template file.

Next, the control section 42 instructs the image-processing section to print the image to be printed, and returns to processing pertaining to step S210.

Figure 21:
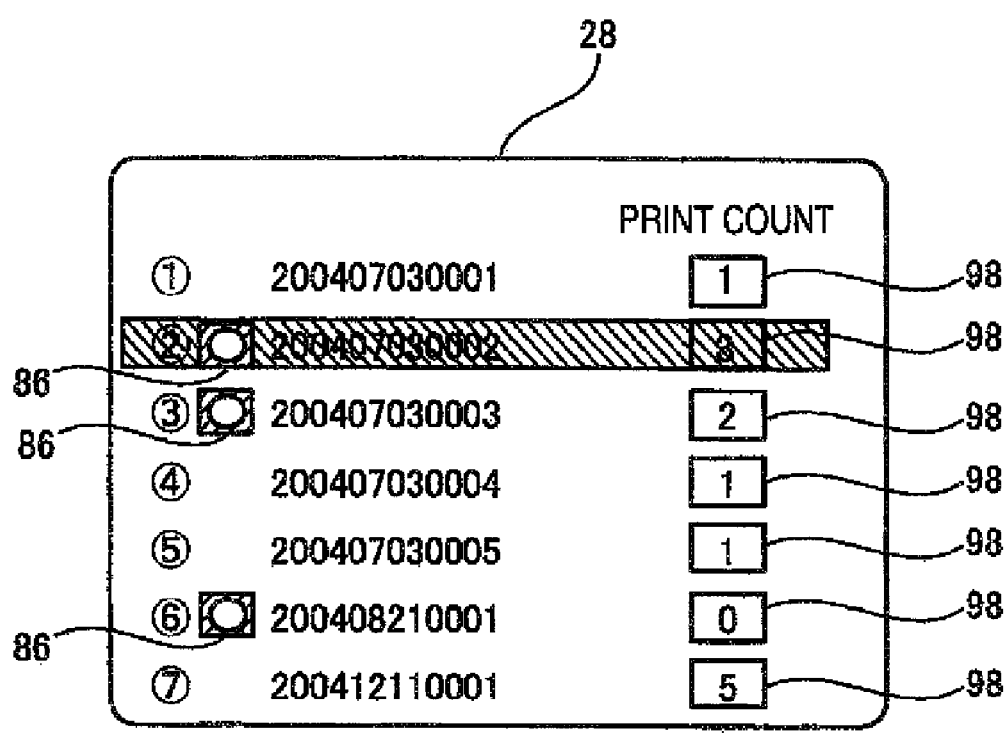
FIG. 21 is a schematic diagram according to the second embodiment of the invention.

Meanwhile, in the second embodiment, when the photographic image stored in the removable memory 15 is displayed on the LCD 28, the mark 86 indicating existence of a related frame image may be displayed in conjunction with a photographic image. In addition, when a related frame image exists, a composite image therewith may be displayed. Furthermore, the second embodiment is configured such that the photographic image stored in the removable memory 15 is displayed on the LCD 28; alternatively, as illustrated in FIG. 21, file names of the respective photographic images may be displayed in conjunction with a print-count-setting box and the marks 86 indicating existence of related frame images.

In addition, in the second embodiment, the print conditions are set by a user by means of operating the operating section 13 while referring to the screen displayed on the display section 11; however, the print conditions may be set in accordance with a DPOF (digital print order format) file stored in the removable memory 15 in advance. The DPOF is a format for recording print conditions for performing printing of a photographic image, or the like, into a removable memory in which a photographic image has been recorded in advance.

As described above, according to the second embodiment of the invention, a user can set merging conditions for the respective photographic images individually in conjunction with other print conditions, such as a size of printing paper, in a mode for setting print conditions with regard to the individual photographic images to be continuously printed.

Third Embodiment

A third embodiment relates to a slide show function of a digital still camera (DSC) for sequentially displaying photographic images stored in a removable memory 115. Next, the third embodiment of the invention, in which, in the slide show mode of a DSC 100, processing for displaying a single photographic image stored in the removable memory 115 in accordance with a merging condition is processed as a single job, will be described. Hereinbelow, this job is called a slide-show job.

Figure 22A:
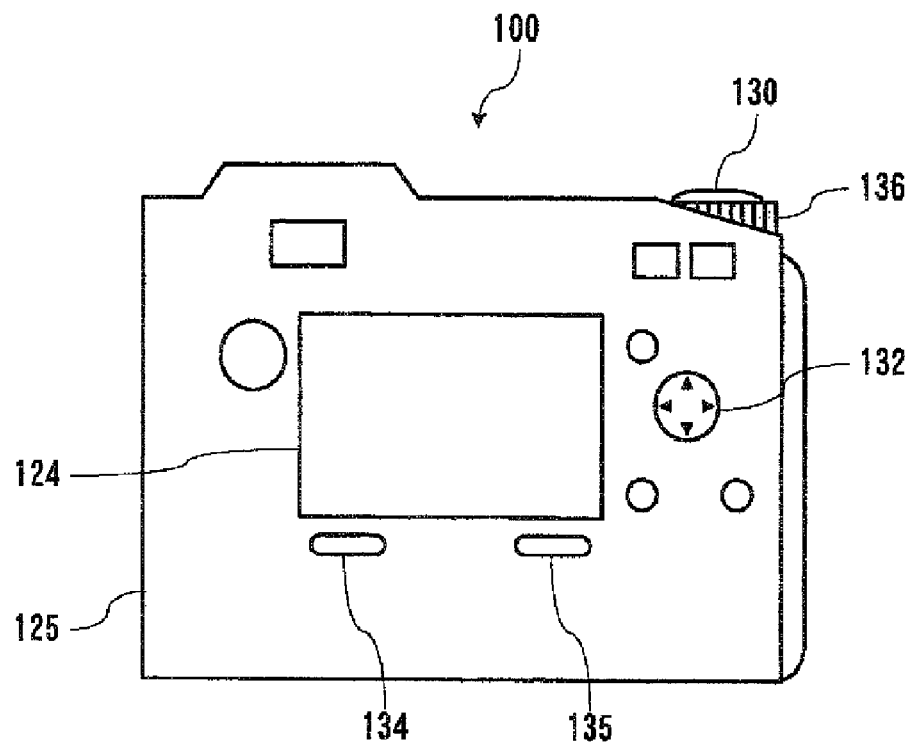
FIG. 22A is a rear view according to a third embodiment of the invention.
Figure 22B:
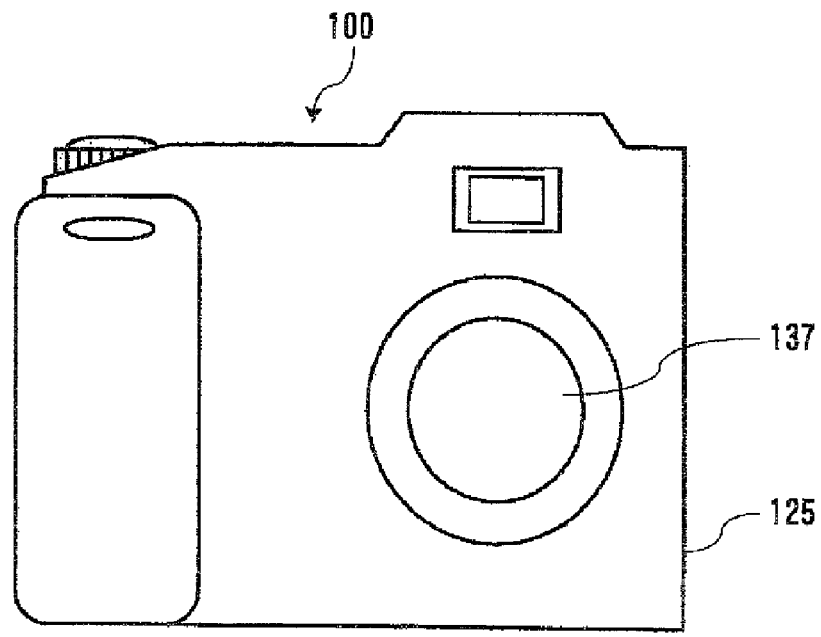
FIG. 22B is a front view according to the third embodiment of the invention.

FIGS. 22A and 22B are a rear view and a front view, both of which indicate external appearances of the DSC 100 serving as an image-processing system according to the third embodiment. An operating section 113, an LCD 124, a lens 137, an unillustrated card slot, and the like, are disposed on an enclosure 125. The operating section 113 has a dial switch 136, push-button switches 134 and 135, a cross key 132, a shutter switch 130, and the like. A menu for establishing a variety of settings is displayed on the LCD 124, and the displayed menu is operated with the above-described variety of operating buttons.

Figure 23:
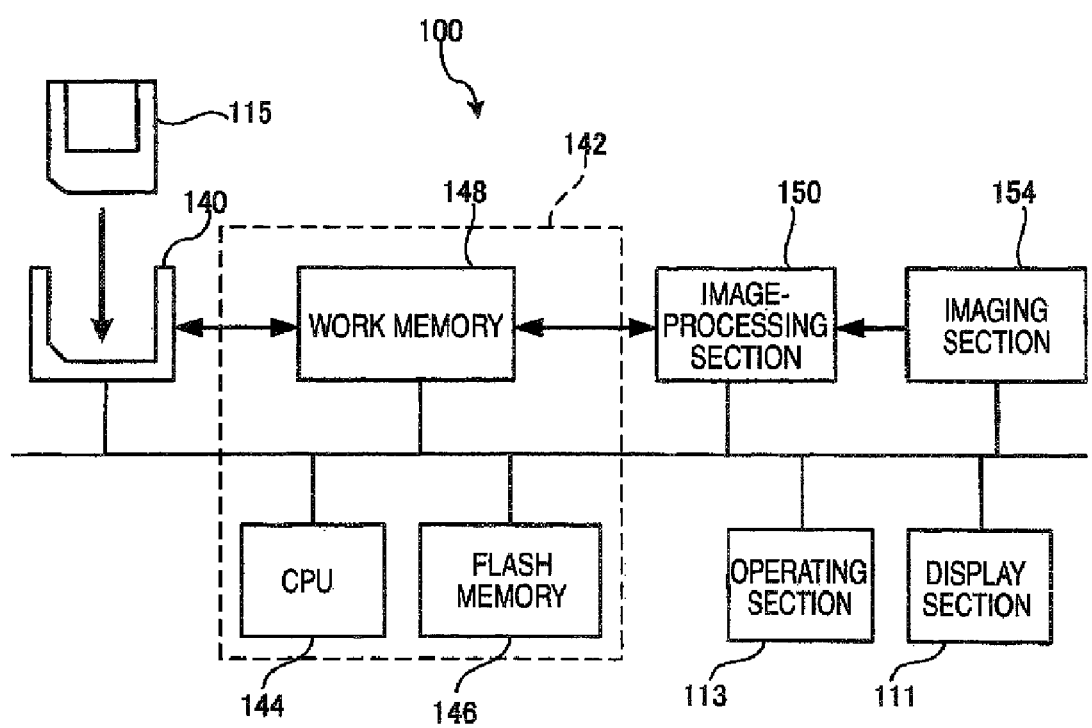
FIG. 23 is a block diagram according to the third embodiment of the invention.

FIG. 23 is a block diagram illustrating the configuration of the DSC 100.

An imaging section 154 comprises an optical system, an image sensor, and an analog front end section. The optical system—which is formed from the lens 137, an aperture, and the like—causes an optical image of a subject to be formed on a light-receiving face of the image sensor. The image sensor accumulates, for each light-receiving cell, charges obtained through photoelectric conversion of the optical image formed by the optical system for a predetermined time period, thereby outputting an electrical signal in accordance with an amount of light received for each light-receiving cell. The analog front end section quantizes the electrical signal output from the image sensor, and converts the same into a digital signal.

An image-processing section 150 carries out, with regard to the digital signal output from the analog front-end section of the imaging section 154, image-forming processing, white balance correction, gamma control, color space conversion, and the like, thereby forming a photographic image which represents halftone values of R, G, and B, and halftone values of Y, Cb, and Cr, of the respective pixels.

A control section 142 has a CPU 144, a flash memory 146, and a work memory 148. The CPU 144 executes programs stored in the flash memory 146, thereby controlling the entire DSC 100. In addition, by means of executing a job execution program stored in the flash memory 146, the CPU 144 functions as job-receiving section, job-setting-receiving section, and job-processing section. The flash memory 146 is a memory for storing a variety of programs and data; and the work memory 148 is a memory for temporarily storing a variety of programs and data. The work memory 148 is also used as a memory in which the image processing section 150 temporarily stores data. This variety of programs and data may be downloaded from a given server by way of a network, to thus be input; alternatively, they may be read from a computer-readable storage medium, such as the removable memory 115, to thus be input.

A memory-read-and-write section 140 has a connection terminal to which the removable memory 115 serving as a storage medium is detachably connected, a memory controller, and the like. The memory-read-and-write section 140, which is controlled by the control section 142, writes and reads a variety of data, such as a photographic image, into and from the removable memory 115.

A display section 111, serving as an output section, has a display controller, the LCD 124, and the like. The display controller is controlled by the control section 142, and displays on the LCD 124 the thus-generated image which is to be displayed, a photographic image, a menu, and a variety of other information.

Figure 24:
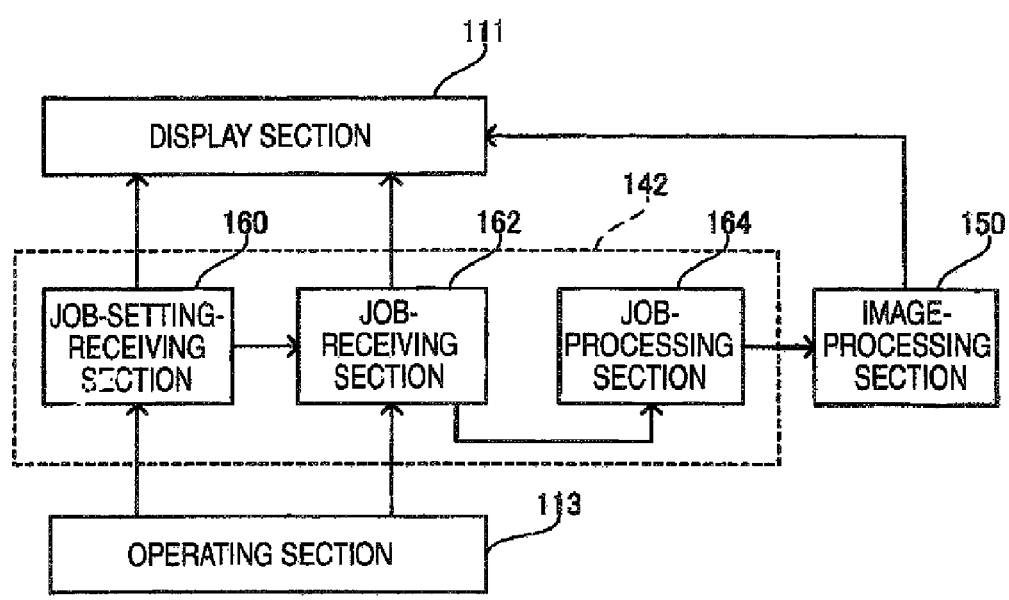
FIG. 24 is a functional block diagram according to the third embodiment of the invention.

FIG. 24 is a functional block diagram illustrating a logical configuration of the DSC 100 serving as the third embodiment of the image-processing program of the present invention. A job execution program to be executed by the CPU 144 is formed from a job-setting-receiving section 160, a job-receiving section 162, a job-processing section 164, and the like.

The job-receiving section 162 collectively receives slide show jobs with regard to all the photographic images stored in the removable memory 115.

The job-setting-receiving section 160 collectively receives slide-show settings with regard to all the photographic images received by the job-receiving section 162. The slide-show settings include a time interval between frames, a merging setting, and the like. In the third embodiment, the slide-show settings are uniformly set for all the photographic images to be displayed. More specifically, according to the present embodiment, the merging condition is uniformly set to all the photographic images to be displayed.

The job-processing section 164 acquires image files corresponding to the photographic images which are the objects of the slide show job; and retrieves, from the removable memory 115, a template file defining a frame file related to the image file. The job-processing section 164 generates an image to be displayed on the basis of the acquired image file and the template file related thereto. Meanwhile, there may be employed such a configuration that a slide-show job is received with regard to a frame image, and a setting of a merging condition with a photographic image is received with regard to the slide-show job of the frame image.

Figure 25:
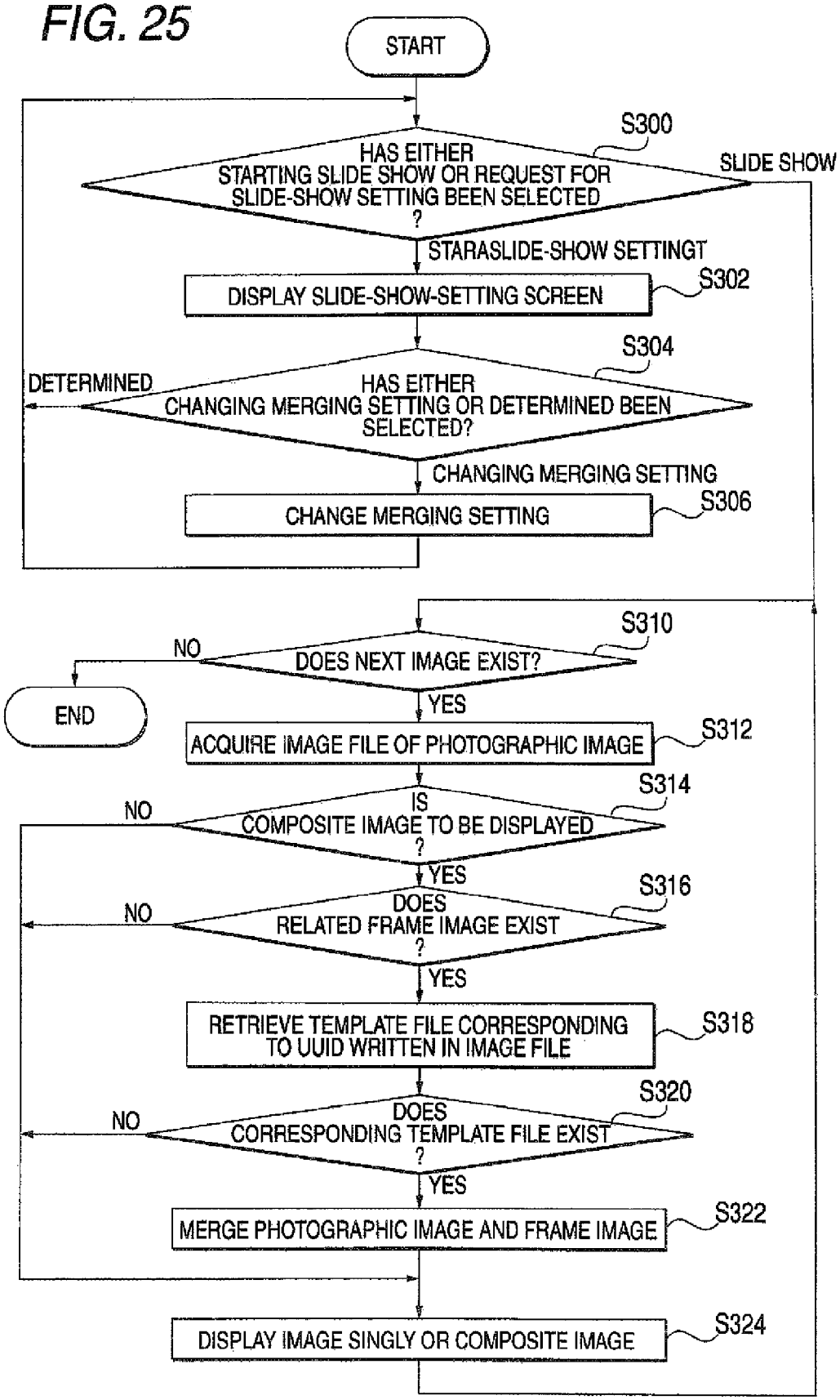
FIG. 25 is a flowchart according to the third embodiment of the present invention.

FIG. 25 is a flowchart illustrating an image-processing method according to the third embodiment of the invention. First, the control section 142 receives a slide-show job or a request for setting a slide show. More specifically, e.g., when a user rotates the dial switch 136 to thus select a playback mode, the control section 142 displays on the LCD 124 a playback menu screen 170 illustrated in FIG. 26. The control section 142 waits for a user to operate a button in a situation where the playback menu screen 170 is displayed on the LCD 124. When the user operates the cross key 132 to select "start slide show" on the playback menu screen 170, and presses the push-button switch 135 serving as an enter button, the control section 142 receives slide-show jobs with regard to all the image files of a given format stored in a given directory in the removable memory 115. In addition, when the user operates the cross key 132 to select "slide-show setting" on the playback menu screen 170, and presses the push-button switch 135 serving as a decision button, the control section 142 collectively receives a request for slide-show setting (step S300).

Figure 26:
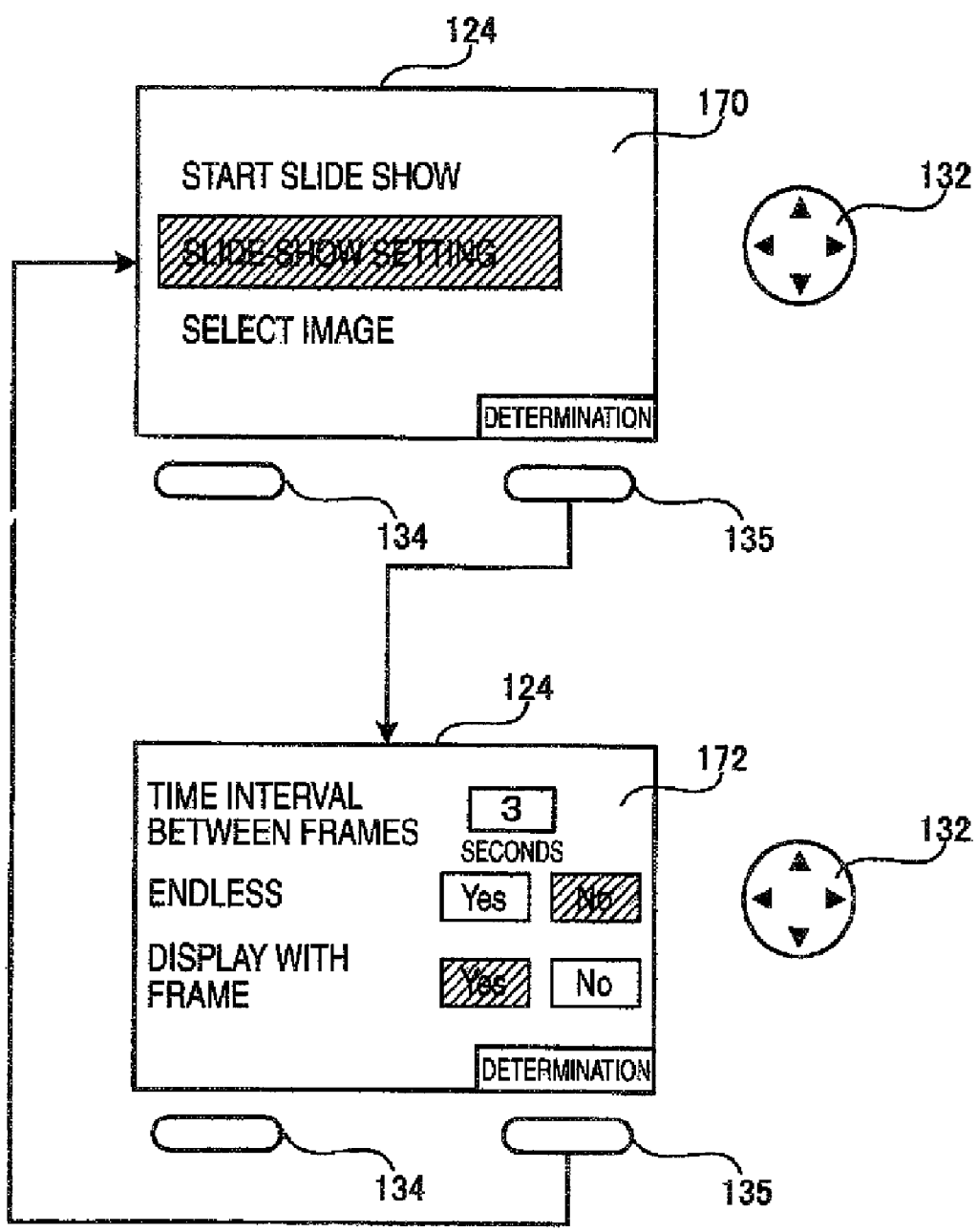
FIG. 26 is a screen-transition diagram according to the third embodiment of the invention.

Next, the control section 142 receives a related setting command. More specifically, upon receipt of the request for slide-show setting, the control section 142 waits for the user to operate a button in a situation where a slide-show-setting screen 172 illustrated in FIG. 26 is displayed on the LCD 124 (steps S302, S304). When the user operates the cross key 132 to change a merging condition on the slide-show-setting screen 172, and presses the push-button switch 135 serving as a decision button, the control section 142 receives the operation as a related setting command. Upon receipt of the related setting command, the control section 142 changes the merging condition stored within the work memory 148 (step S306), and displays the playback menu screen 170.

Next, the control section 142 starts generation of an image to be displayed. More specifically, when the user operates the cross key 132 on the playback menu screen 170 to select "start slide show," and presses the push-button switch 135 serving as a decision button (step S300), the control section 142 proceeds to processing pertaining to step S310.

Next, the control section 142 reads photographic images sequentially. More specifically, the control section 142 controls the memory-read-and-write section 140 to thus sequentially read into the work memory 148 image files of a given format stored in a given directory in the removable memory 115, and performs processing of steps S314 and subsequent thereto with regard to the respective image files. More specifically, e.g., the control section 142 sequentially reads into the work memory 148 image files of a JPEG format stored in a given directory (step S310, step S312).

Next, the control section 142 makes a determination as to the merging condition. More specifically, the control section 142 refers to the merging condition stored in the work memory 148; and, when a merging setting is stored, proceeds to processing pertaining to step S316, and when a non-merging setting is stored, proceeds to processing pertaining to step S324 (step S314).

Next, with regard to each of the image files, the control section 142 makes a determination of presence/absence of a related frame image. For instance, the control section 142 refers to a UUID written in the image file, and when a UUID is written, determines that a related frame image exists, and when no UUID is written, determines that no related frame image exists (step S316).

Next, the control section 142 retrieves a template file. More specifically, the control section 142 retrieves, from the removable memory 115, a template file corresponding to the UUID written in the image file, thereby making a determination of presence/absence of the corresponding template file (step S318 and step S320). Here, when the corresponding template file exists, the control section 142 proceeds to processing pertaining to step S322; and when the corresponding template file does not exist, proceeds to processing pertaining to step S324.

When the template file corresponding to the UUID written in the image file exists, the control section 142 merges the frame image and the photographic image (step S322). The frame image is merged with the photographic image in accordance with the template file retrieved in step S318. More specifically, the control section 142 lays out the frame image in an enlarged or reduced manner, on a frame-image-rendering area specified by the template file. In addition, the control section 142 lays out the photographic image in an enlarged or reduced manner, on the frame-image-rendering area specified by the template file.

Finally, the control section 142 displays the image to be displayed on the display section 111 (step S324), and returns to step S310. When the merging condition is a merging setting, the image to be displayed is a composite image of the frame image and the photographic image; and when the merging condition is a non-merging setting, the image to be displayed is solely the photographic image. The control section 142 repeats processing from S310 to S324, whereby images to be displayed are continuously displayed on the LCD 124.

The invention claimed is:

1. An image-processing system comprising:
   a job-receiving section for receiving a job with regard to a first-type image;
   a job-setting-receiving section for receiving, with regard to the job of the first-type image to which a second-type image is related, a command for selecting either a merging setting or a non-merging setting; and
   a job-processing section for processing the job having been received, wherein:
      the merging setting is a setting for merging the first-type image and the second-type image, and the non-merging setting is a setting for not merging the first-type image and the second-type image;
      the job-processing section displays, with regard to the job of the first-type image to which the second-type image is related, either the first-type image, or a composite image of the first-type image and the second-type image on an output section in accordance with the command received by the job-setting-receiving section;
      for the purpose of printing an index image of a plurality of first-type images stored in a given area, the job-receiving section collectively receives a plurality of jobs whose objects are respective ones of the plurality of first-type images;
      the job-processing section continuously processes the plurality of jobs received, and causes the output section to print the index image; and
      if the non-merging setting is selected with the command, then a mark, which indicates existence of the second-type image that is related to the first-type image, is laid out along the first-type image in the index image and then the index image having the mark laid out along the first-type image is printed.

2. The image-processing system according to claim 1, wherein the job-setting-receiving section displays a menu on a display for receiving, with regard to the job, a command for setting a processing-condition item different from a processing condition item with which the merging setting or the non-merging setting is selected.

3. The image-processing system according to claim 1, wherein the job-setting-receiving section receives, with regard to the jobs of all the first-type images to which the second-type image is related, a command for uniformly selecting either the merging setting or the non-merging setting.

4. The image-processing system according to claim 1, wherein the job-setting-receiving section receives, with regard to each of the jobs of the first-type images to which the second-type image is related, a command for individually selecting either a merging setting or a non-merging setting.

5. The image-processing system according to claim 1, further comprising the output section.

6. The image-processing system according to claim 1, further comprising:
   a first retrieval section for retrieving the first-type image from a recording medium; and
   a correspondence-data-generation section which determines whether or not an identifier of the second-type image is stored in the first-type image retrieved by the first retrieval section, and which, on the basis of a result of determination, generates data pertaining to correspondence between the first-type image and the second-type image, wherein
   the job-processing section refers to the data pertaining to correspondence.

7. The image-processing system according to claim 1, further comprising a correspondence-data-generation section for generating data pertaining to correspondence between the first-type image and the second-type image when a removable recording medium is connected thereto, wherein the job-processing section refers to the data pertaining to correspondence.

8. A computer readable storage medium comprising an image-processing program by which a computer for controlling an output section functions to comprise:
   a job-receiving section for receiving a job with regard to a first-type image;
   a job-setting-receiving section for receiving, with regard to the job of the first-type image to which a second-type image is related, a command for selecting either a merging setting or a non-merging setting wherein the merging setting is a setting for merging the first-type image and the second-type image, and the non-merging setting is a setting for not merging the first-type image and the second-type image; and
   a job-processing section for processing the job having been received, wherein the job-processing section displays, with regard to the job of the first-type image to which the second-type image is related, either the first-type image, or a composite image of the first-type image and the second-type image on the output section, in accordance with the command received by the job-setting-receiving section,
   wherein:
      for the purpose of printing an index image of a plurality of first-type images stored in a given area, the job-receiving section collectively receives a plurality of jobs whose objects are respective ones of the plurality of first-type images;

the job-processing section continuously processes the plurality of jobs received, and causes the output section to print the index image; and if the non-merging setting is selected with the command, then a mark, which indicates existence of the second-type image that is related to the first-type image, is laid out along the first-type image in the index image and then the index image having the mark laid out along the first-type image is printed.

9. An image-processing method with use of a computer for controlling an output section, comprising:

a job-receiving step of receiving a job with regard to a first-type image;

a job-setting-receiving step of receiving, with regard to the job of the first-type image to which a second-type image is related, a command for selecting either a merging setting or a non-merging setting; and a job-processing step of processing the job having been received, wherein:

the merging setting is a setting for merging the first-type image and the second-type image, and the non-merging setting is a setting for not merging the first-type image and the second-type image;

the job-processing step includes a step of displaying, with regard to the job of the first-type image to which the second-type image is related, either the first-type image, or a composite image of the first-type image and the second-type image on the output section in accordance with the command received by the job-setting-receiving step;

for the purpose of printing an index image of a plurality of first-type images stored in a given area, a plurality of jobs, whose objects are respective ones of the plurality of first-type images, are collectively received in the job-receiving step;

in the job-processing section, the plurality of jobs received are continuously processed, and the output section is caused to print the index image; and if the non-merging setting is selected with the command, then a mark, which indicates existence of the second-type image that is related to the first-type image, is laid out along the first-type image in the index image and then the index image having the mark laid out along the first-type image is printed.

* * * * *